United States Patent
Takahashi et al.

(10) Patent No.: US 10,791,297 B2
(45) Date of Patent: Sep. 29, 2020

(54) MANUFACTURING-STATE DISPLAY SYSTEM, MANUFACTURING-STATE DISPLAY METHOD, AND COMPUTER-READABLE RECORDING MEDIUM

(71) Applicant: FUJITSU LIMITED, Kawasaki-shi, Kanagawa (JP)

(72) Inventors: Kazuki Takahashi, Wako (JP); Takehiko Nishimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 7 days.

(21) Appl. No.: 15/910,359

(22) Filed: Mar. 2, 2018

(65) Prior Publication Data

US 2018/0191988 A1    Jul. 5, 2018

Related U.S. Application Data

(63) Continuation of application No. PCT/JP2015/077829, filed on Sep. 30, 2015.

(51) Int. Cl.
*H04N 5/445*     (2011.01)
*H04N 7/18*      (2006.01)
(Continued)

(52) U.S. Cl.
CPC ..... *H04N 5/44591* (2013.01); *G05B 19/4183* (2013.01); *G06Q 10/06* (2013.01);
(Continued)

(58) Field of Classification Search
CPC ...... H04N 5/44591; H04N 5/04; H04N 7/181; G06T 11/206
(Continued)

(56) References Cited

U.S. PATENT DOCUMENTS 5,555,223 A * 9/1996 Barainsky ................ G04F 1/00
                                                  116/206
6,850,636 B1   2/2005 Yabe
(Continued)

FOREIGN PATENT DOCUMENTS

JP    2000334641 A  *  5/1999
JP    2000-334641      12/2000
(Continued)

OTHER PUBLICATIONS

International Search Report dated Nov. 24, 2015 in corresponding International Patent Application No. PCT/JP2015/077829.
(Continued)

*Primary Examiner* — Zaihan Jiang
(74) *Attorney, Agent, or Firm* — Staas & Halsey LLP

(57) ABSTRACT

A manufacturing-state display system that displays a manufacturing status of a product manufactured through a plurality of manufacturing processes, the manufacturing-state display system includes: displaying a graph that indicates a time elapsed from start to end of each of the manufacturing processes based on information on start times and end times of the manufacturing processes, each of the manufacturing processes being segmented in order of execution of the manufacturing processes and time axes being aligned in an identical direction; receiving designation of an area that indicates manufacturing for any product in any manufacturing process on the graph displayed; and reproducing a captured image that corresponds to a start time to an end time of manufacturing for a specific product in a specific manufacturing process, specified by the area of which the designation has been received, among captured images with regard to the manufacturing processes.

24 Claims, 15 Drawing Sheets

(51) Int. Cl.
  *H04N 5/04* (2006.01)
  *G06Q 50/04* (2012.01)
  *G06Q 10/06* (2012.01)
  *G05B 19/418* (2006.01)
  *G06T 11/20* (2006.01)

(52) U.S. Cl.
  CPC ............ *G06Q 50/04* (2013.01); *G06T 11/206* (2013.01); *H04N 5/04* (2013.01); *H04N 7/181* (2013.01); *Y02P 90/265* (2015.11)

(58) Field of Classification Search
  USPC .......................................................... 348/86
  See application file for complete search history.

(56) References Cited

U.S. PATENT DOCUMENTS

| | | | | |
|---|---|---|---|---|
| 8,334,877 | B2* | 12/2012 | Saed | H04N 5/2624 345/619 |
| 2006/0187230 | A1* | 8/2006 | Jung | H04N 5/23293 345/581 |
| 2007/0081133 | A1* | 4/2007 | Kayama | G03F 7/70783 355/53 |
| 2007/0299643 | A1* | 12/2007 | Guyaguler | G01V 11/00 703/10 |
| 2010/0234974 | A1* | 9/2010 | Bosga | B30B 15/148 700/100 |
| 2011/0206283 | A1* | 8/2011 | Quarfordt | G06K 9/0061 382/220 |
| 2014/0350708 | A1 | 11/2014 | Kobayashi | |
| 2015/0097840 | A1 | 4/2015 | Nishimura et al. | |

FOREIGN PATENT DOCUMENTS

| | | |
|---|---|---|
| JP | 2000334641 A * | 12/2000 |
| JP | 2003150230 A * | 11/2001 |
| JP | 2003-150230 | 5/2003 |
| JP | 2003150230 A * | 5/2003 |
| JP | 2005-311528 | 11/2005 |
| JP | 2006-172350 | 6/2006 |
| JP | 2006-302096 | 11/2006 |
| JP | 2010-40007 | 2/2010 |
| JP | 2015-75795 | 4/2015 |
| WO | WO 2013/035687 A1 | 3/2013 |

OTHER PUBLICATIONS

Written Opinion of the International Searching Authority dated Nov. 24, 2015 in corresponding International Patent Application No. PCT/JP2015/077829.

* cited by examiner

FIG.4

| PRODUCT NUMBER | PROCESS A | | PROCESS B | | PROCESS C | | PROCESS D | | PROCESS E | | PROCESS F | | PROCESS G | |
|---|---|---|---|---|---|---|---|---|---|---|---|---|---|---|
| | START TIME | END TIME | START TIME | END TIME | START TIME | END TIME | START TIME | END TIME | START TIME | END TIME | START TIME | END TIME | START TIME | END TIME |
| SN0001 | 9:00:00 | 9:00:05 | 9:00:05 | 9:00:20 | 9:00:20 | 9:00:30 | 9:00:30 | 9:00:50 | 9:00:50 | 9:01:20 | 9:01:20 | 9:01:25 | 9:01:25 | 9:01:35 |
| SN0002 | 9:00:30 | 9:00:35 | 9:00:35 | 9:00:50 | 9:00:50 | 9:01:00 | 9:01:00 | 9:01:25 | 9:01:25 | 9:01:55 | 9:01:55 | 9:02:00 | 9:02:00 | 9:02:10 |
| SN0003 | 9:01:00 | 9:01:05 | 9:01:05 | 9:01:20 | 9:01:20 | 9:01:30 | 9:01:30 | 9:01:55 | 9:01:55 | 9:02:25 | 9:02:25 | 9:02:30 | 9:02:30 | 9:02:40 |
| SN0004 | 9:01:30 | 9:01:35 | 9:01:35 | 9:01:50 | 9:01:50 | 9:02:00 | 9:02:00 | 9:02:25 | 9:02:25 | 9:02:50 | 9:02:50 | 9:02:55 | 9:02:55 | 9:03:05 |
| SN0005 | 9:02:00 | 9:02:05 | 9:02:05 | 9:02:20 | 9:02:20 | 9:02:30 | 9:02:30 | 9:02:55 | 9:02:55 | 9:03:20 | 9:03:20 | 9:03:25 | 9:03:25 | 9:03:35 |
| SN0006 | 9:02:30 | 9:02:35 | 9:02:35 | 9:02:50 | 9:02:50 | 9:03:00 | 9:03:00 | 9:03:25 | 9:03:25 | 9:03:55 | 9:03:55 | 9:04:00 | 9:04:00 | 9:04:10 |
| ... | ... | ... | ... | ... | ... | ... | ... | ... | ... | ... | ... | ... | ... | ... |

| PROCESS | CAMERA ID | MASK | X | Y | WIDTH | HEIGHT |
|---------|-----------|------|-----|----|-------|--------|
| A | CAMERA C1 | FALSE | | | | |
| B | CAMERA C2 | FALSE | | | | |
| C | CAMERA C2 | FALSE | | | | |
| D | CAMERA C3 | FALSE | | | | |
| E | CAMERA C4 | TRUE | 10 | 10 | 200 | 400 |
| F | CAMERA C4 | TRUE | 210 | 10 | 200 | 400 |
| G | CAMERA C4 | TRUE | 420 | 10 | 200 | 400 |

FIG.6

| CAMERA ID | RECORDING START TIME AND DATE | RECORDING END TIME AND DATE | FILE NAME | ... |
|-----------|-------------------------------|------------------------------|-----------|-----|
| CAMERA C1 | 2015/7/10 8:55 | 2015/7/10 19:05 | C1-20150710.mp4 | ... |
| ... | ... | ... | ... | ... |
| CAMERA C2 | 2015/7/10 8:55 | 2015/7/10 19:05 | C2-20150710.mp4 | ... |
| ... | ... | ... | ... | ... |
| CAMERA C3 | 2015/7/10 8:55 | 2015/7/10 19:05 | C3-20150710.mp4 | ... |
| ... | ... | ... | ... | ... |
| CAMERA C4 | 2015/7/10 8:55 | 2015/7/10 19:05 | C4-20150710.mp4 | ... |
| ... | ... | ... | ... | ... |

MANUFACTURING-STATE DISPLAY SYSTEM, MANUFACTURING-STATE DISPLAY METHOD, AND COMPUTER-READABLE RECORDING MEDIUM

CROSS-REFERENCE TO RELATED APPLICATION

This application is a continuation of International Application No. PCT/JP2015/077829, filed on Sep. 30, 2015, the entire contents of which are incorporated herein by reference.

FIELD

The embodiment discussed herein is related to a manufacturing-state display system, a manufacturing-state display method, and a manufacturing-state display program.

BACKGROUND

Data associated with industry activities are stored and utilized. For example, data such as operational logs of the manufacturing device in an assembly line for a product is stored and utilized to improve the production process. Furthermore, there is disclosure that the flow of a product is plotted on the graph that is represented by each process and a time so that the manufacturing status of each process is visualized and displayed.

Patent Literature 1: Japanese Laid-open Patent Publication No. 2015-075795

In some cases, however, if a user views the graph that visualizes the manufacturing status of each process and notices that there is the process that needs to be further checked, the user desires to check how an operation was performed during the process.

SUMMARY

According to an aspect of an embodiment, a manufacturing-state display system that displays a manufacturing status of a product manufactured through a plurality of manufacturing processes, the manufacturing-state display system includes: a memory; and a processor coupled to the memory, wherein the processor executes a process including: displaying a graph that indicates a time elapsed from start to end of each of the manufacturing processes based on information on start times and end times of the manufacturing processes, each of the manufacturing processes being segmented in order of execution of the manufacturing processes and time axes being aligned in an identical direction; receiving designation of an area that indicates manufacturing for any product in any manufacturing process on the graph displayed; and reproducing a captured image that corresponds to a start time to an end time of manufacturing for a specific product in a specific manufacturing process, specified by the area of which the designation has been received, among captured images with regard to the manufacturing processes.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram that illustrates an example of a log DB;

FIG. 5 is a diagram that illustrates an example of a camera definition table;

FIG. 6 is a diagram that illustrates an example of an image DB;

DESCRIPTION OF EMBODIMENT

Preferred embodiments of the present invention will be explained with reference to accompanying drawings. Furthermore, the disclosed technology is not limited to the present embodiment. Furthermore, the following embodiments may be combined as appropriate to such a degree that there is no contradiction.

Figure 1:
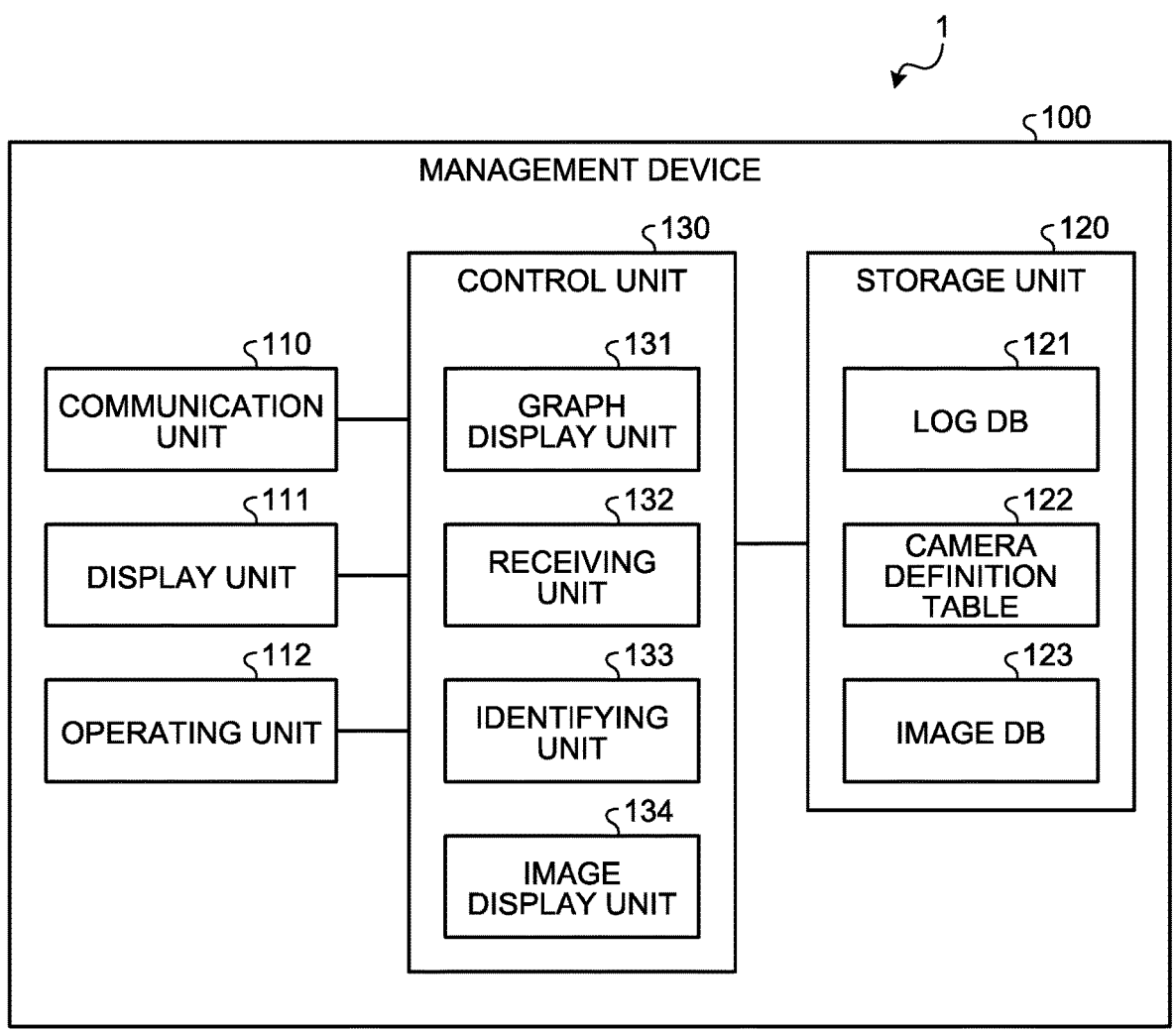
FIG. 1 is a block diagram that illustrates an example of the configuration of a manufacturing-state display system according to an embodiment.

FIG. 1 is a block diagram that illustrates an example of the configuration of a manufacturing-state display system according to the embodiment. A manufacturing-state display system 1 illustrated in FIG. 1 includes a management device 100. In addition to the management device 100, the manufacturing-state display system 1 may include for example a control device for each manufacturing process, a control device for a working machine, or various test devices for temperature test, and the like, and the management device 100 may acquire log data from various devices. Furthermore, the manufacturing-state display system 1 may include a terminal device for the administrator. The management device 100 is connected to various devices via an undepicted network such that they can communicate with each other. Furthermore, an explanation is given below of a case where various types of information on the assembly line of a product are acquired as log data.

The management device 100 in the manufacturing-state display system 1 illustrated in FIG. 1 displays the manufacturing status of the product that is manufactured through a plurality of manufacturing processes. The displayed manufacturing status is for example the graph based on the information on the start time and the end time of each manufacturing process in accordance with log data and the captured image that captures each manufacturing process. Furthermore, in the following explanation, a manufacturing process is also simply referred to as a process. The management device 100 displays the graph that indicates the time elapsed from the start to the end of each of the manufacturing processes on the basis of the information on the start time and the end time of the manufacturing process, each of the manufacturing processes being segmented in order of execution of the manufacturing processes and the time axes being aligned in the identical direction. The management device 100 receives designation of the area that indicates manufacturing for any product in any manufacturing process on the displayed graph. The management device 100 reproduces the captured image that corresponds to the start time to the end time of manufacturing for a specific product in a specific manufacturing process, specified by the area of which designation has been received, among the captured images for the manufacturing processes. This allows the management device 100 to reproduce the moving image that corresponds to the designated process and product.

Figure 2:
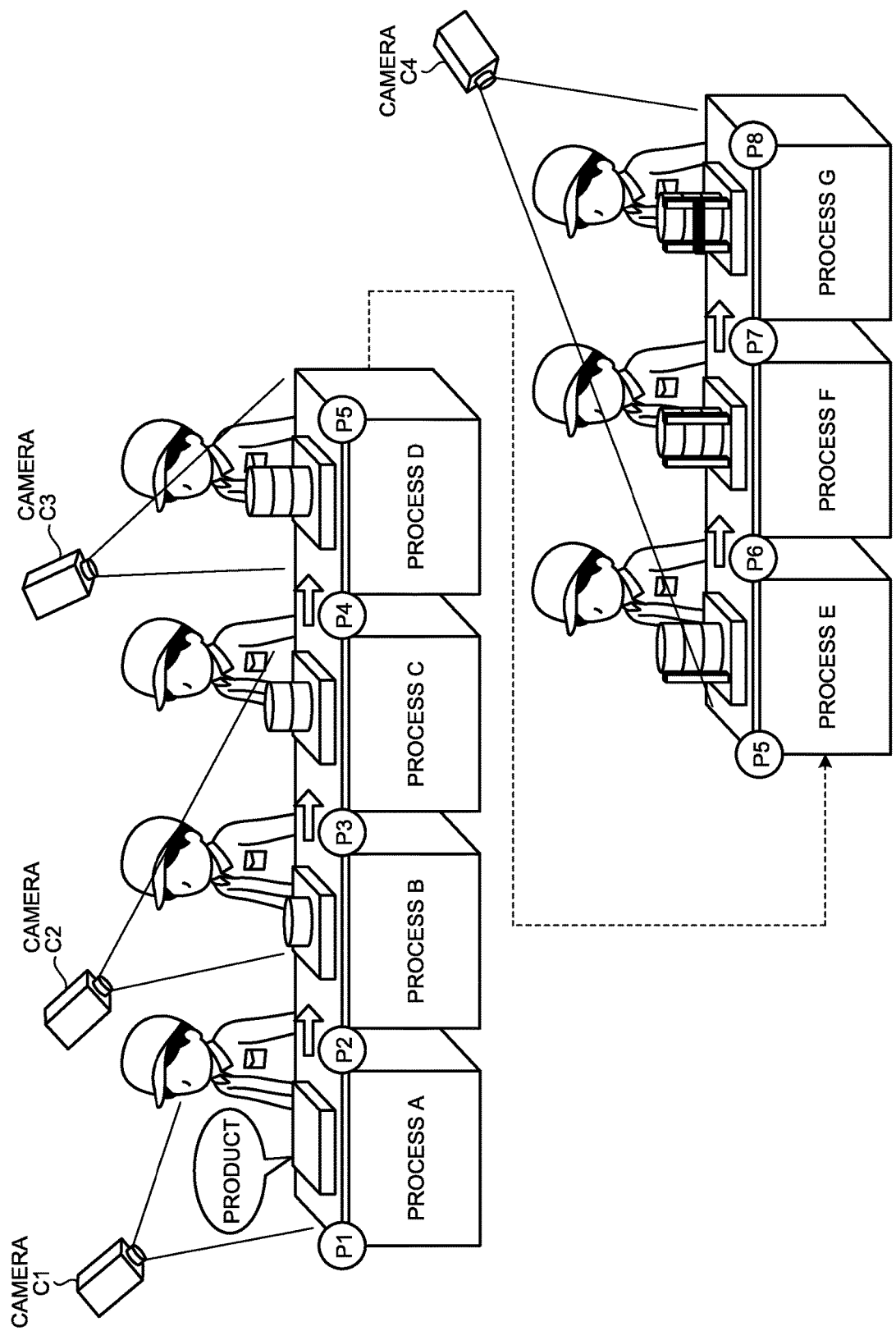
FIG. 2 is a diagram that illustrates an example of a manufacturing process.

With reference to FIG. 2, an explanation is given of an example of the manufacturing process according to the present embodiment. FIG. 2 is a diagram that illustrates an example of the manufacturing process. As illustrated in FIG. 2, the manufacturing processes include seven processes from a process A to a process G. During each process, for example, a worker conducts an assembly operation on a product. In the example of FIG. 2, P1 to P8 represent the start and end timings of each process. In the present embodiment, for example, as a product is carried in the manufacturing line, an explanation is given based on the assumption that, for example, the end timing of the process A is simultaneous with the start timing of the process B. Furthermore, the start and end timings of each process may be different timings if the product is moved in the interval of processes. Furthermore, in the example of the manufacturing process of FIG. 2, a camera C1 is provided to capture the process A, a camera C2 to capture the processes B and C, a camera C3 to capture the process D, and a camera C4 to capture the processes E to G.

Figure 3:
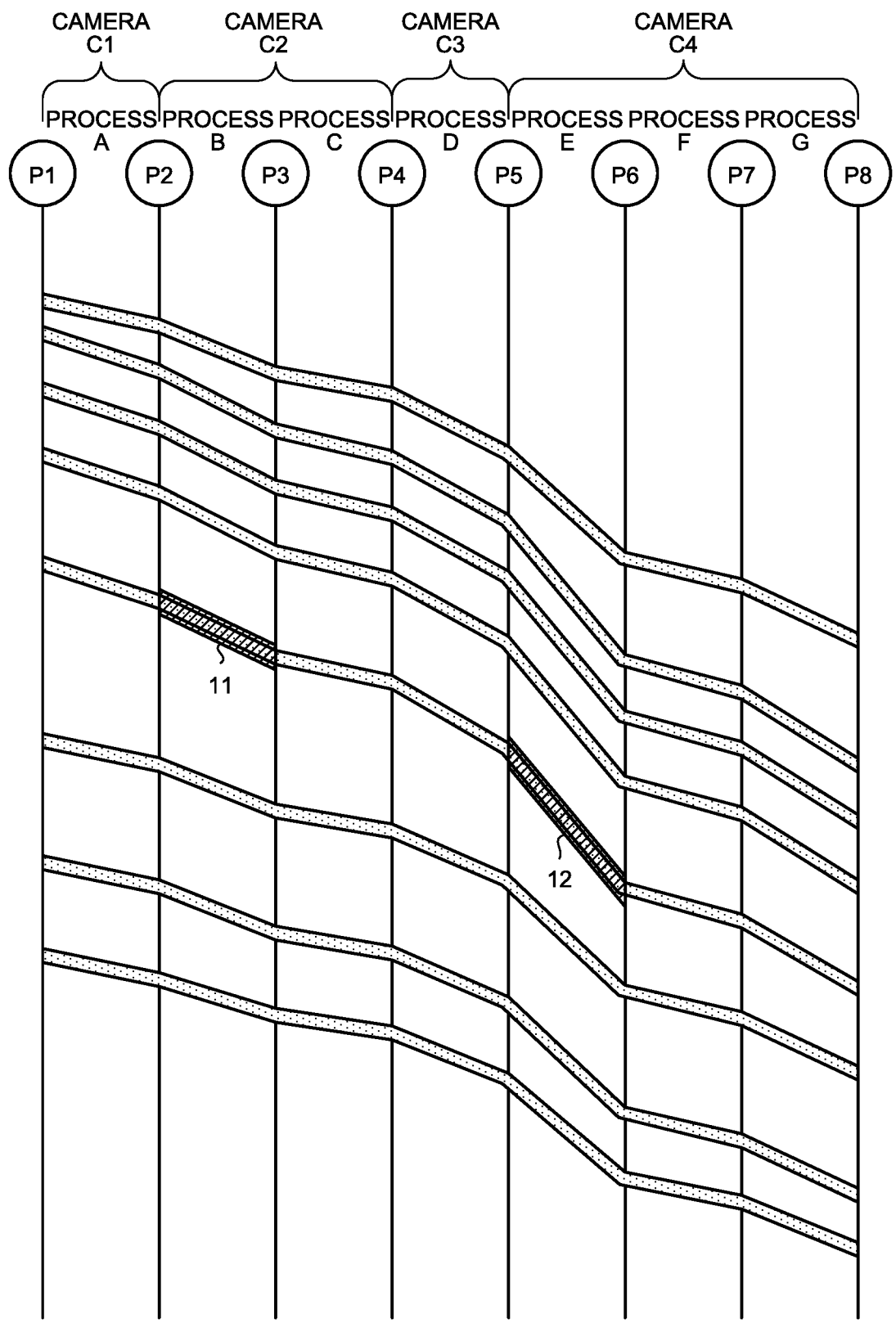
FIG. 3 is a diagram that illustrates an example of a graph that represents the status of a manufacturing process.

With reference to FIG. 3, an explanation is given of an example of the graph that represents the status of the manufacturing process according to the present embodiment. FIG. 3 is a diagram that illustrates an example of the graph that represents the status of the manufacturing process. As illustrated in FIG. 3, the graph (hereafter, referred to as the timeline graph) that represents the statuses of the manufacturing processes corresponds to the manufacturing processes illustrated in FIG. 2, and the graph indicates the elapsed time of each of the processes. A time axis P1 on the timeline graph illustrated in FIG. 3 corresponds to the start timing P1 of the process A in FIG. 2. Furthermore, a time axis P2 on the timeline graph illustrated in FIG. 3 corresponds to the timings P2 for the end of the process A and the start of the process B in FIG. 2. Furthermore, in the same manner, time axes P3 to P8 on the timeline graph illustrated in FIG. 3 correspond to the timings P3 to P8 for the start and the end of the respective processes in FIG. 2. Furthermore, the upper section of the timeline graph in FIG. 3 illustrates the relation among the cameras C1 to C4 and the processes A to G illustrated in FIG. 2. Furthermore, on the timeline graph, the flow of the product is indicated by using the line segment that connects the processes. It is also represented as a trace graph as the line segment traces the flow of the product during the manufacturing processes.

Furthermore, for the timeline graph illustrated in FIG. 3, for example, a threshold is previously set to determine the abnormal value for each process on the basis of the average value, standard value, or the like, of the operating time during each process, and the trace graph in the area where a failure has occurred is highlighted on a per process basis. The area (abnormal area) where a failure has occurred indicates a predetermined state. Furthermore, the abnormal value for each process is determinable if for example there is more than a predetermined inclination on the timeline graph or if the operating time is more than a predetermined length. In the example of FIG. 3, highlighted abnormal areas are an area 11 that corresponds to the process B on the trace graph for a certain product and an area 12 that corresponds to the process E.

Next, with reference back to FIG. 1, a configuration of the management device 100 is explained. As illustrated in FIG. 1, the management device 100 includes a communication unit 110, a display unit 111, an operating unit 112, a storage unit 120, and a control unit 130. Furthermore, in addition to the functional units illustrated in FIG. 1, the management device 100 may include various functional units included in known computers, e.g., various input devices or sound output devices.

The communication unit 110 is implemented by for example an NIC (Network Interface Card). The communication unit 110 is a communication interface that is connected to various devices via an undepicted network wired or wirelessly so as to communicate information with various devices. The communication unit 110 receives log data from various devices. The communication unit 110 outputs the received log data to the control unit 130.

The display unit 111 is a display device that displays various types of information. The display unit 111 is implemented by for example a liquid crystal display as the display device. The display unit 111 displays various screens such as a display screen that is input from the control unit 130.

The operating unit 112 is an input device that receives various operations from the administrator of the manufacturing-state display system 1. The operating unit 112 is implemented by for example a keyboard or a mouse as the input device. The operating unit 112 outputs the operation input by the administrator to the control unit 130 as operation information. The operation information includes for example the position information (hereafter, also referred to as cursor position information) on the display screen during the pointing operation to place the mouse cursor on a display object. Furthermore, the operating unit 112 may be implemented by a touch panel, or the like, as the input device, and the display device, which is the display unit 111, and the input device, which is the operating unit 112, may be integrated with each other.

The storage unit 120 is implemented by for example a semiconductor memory device such as a RAM (random access memory) or a flash memory, or a storage device such as a hard disk or an optical disk. The storage unit 120 includes a log database 121, a camera definition table 122, and an image database 123. Furthermore, in the following explanation, a database is represented by being abbreviated as DB. Furthermore, the storage unit 120 stores the information used for operation of the control unit 130.

The log DB 121 is the database that stores logs during each manufacturing process for the product that is manufactured by conducting manufacturing through a plurality of processes in order. Specifically, the log DB 121 stores, as logs, the start time and the end time of manufacturing during each process for each product on the basis of log data. FIG. 4 is a diagram that illustrates an example of the log DB. As illustrated in FIG. 4, the log DB 121 contains items "product number", "start time", "end time" of each process, and the like. For example, the log DB 121 stores one record for each product.

"Product number" is the number that is uniquely assigned to each product manufactured in a factory, and it is the identifier that identifies a product. "Start time" is the information that indicates the time when manufacturing starts in the corresponding process. "End time" is the information that indicates the time when manufacturing ends in the corresponding process. The example of the first line in FIG. 4 indicates that, with regard to the product with the product number "SN0001", the process A starts at "9:00:00" and ends at "9:00:05", the process B starts at "9:00:05" and ends at "9:00:20", and the process C starts at "9:00:20" and ends at "9:00:30". With regard to the other processes D to G, the example of the first line in FIG. 4 indicates the start time and the end time of each process in the same manner.

With reference back to FIG. 1, the camera definition table 122 stores the camera ID of the camera that corresponds to each process. FIG. 5 is a diagram that illustrates an example of the camera definition table. As illustrated in FIG. 5, the camera definition table 122 contains items "process", "camera ID", "mask", "X", "Y", "width", "Height", or the like. The camera definition table 122 stores for example one record for each process.

"Process" is the identifier that identifies a process. "Camera ID" is the identifier that identifies the camera that captures each process. "Mask" is the information as to whether other processes are masked to display the designated process alone if the camera captures multiple processes. "Mask" is set to "true" if the other processes are masked and "false" is set if the other processes are not masked. "X" and "Y" are the coordinate information for specifying the origin of the rectangle to be displayed if "mask" is "true". "Width" and "height" are the information for specifying the width and the height of the rectangle to be displayed if "mask" is "true".

With reference back to FIG. 1, the image DB 123 stores captured images that are captured by cameras. FIG. 6 is a diagram that illustrates an example of the image DB. As illustrated in FIG. 6, the image DB 123 contains items "camera ID", "recording start time and date", "recording end time and date", and "file name". For example, the image DB 123 stores one record for one captured-image recording.

"Camera ID" is the identifier that identifies the camera that captures each process. "Recording start time and date" is the information that indicates the recording start time and date of a captured image. "Recording end time and date" is the information that indicates the recording end time and date of a captured image. "File name" is the information that indicates the file name of a captured image that is stored in the storage unit 120. "File name" is determined on the basis of for example the camera ID and the recording start time and date or the recording end time and date. The example of the first line in FIG. 6 indicates that, with regard to the camera ID "the camera C1", the recording starts at "2015/7/10 8:55", the recording ends at "2015/7/10 19:05", and the captured image has the file name "C1-20150710.mp4".

That is, the image DB 123 makes it possible to specify a desired captured image file on the basis of the camera ID and the time and date during searching of the captured image. Furthermore, the captured image may be a moving image or a still image, and it may include sound. Furthermore, an explanation is given below of a case where, for example, the captured image is a moving image. Moreover, the image DB 123 stores moving images that correspond to the standard value, the average value, and the shortest value of the operating time during each process.

With reference back to FIG. 1, the control unit 130 is implemented when, for example, a CPU (central processing unit) or an MPU (micro processing unit) executes a program stored in an internal storage device by using the RAM as a work area. Furthermore, for example, the control unit 130 may be implemented by an integrated circuit such as an ASIC (application specific integrated circuit) or an FPGA (field programmable gate array). The control unit 130 includes a graph display unit 131, a receiving unit 132, an identifying unit 133, and an image display unit 134, and it implements or performs information processing functions or operations described below. Furthermore, the internal configuration of the control unit 130 is not limited to the configuration illustrated in FIG. 1, but it may have any configuration as long as it performs information processing described later. Furthermore, in the following explanation, the line segment that corresponds to each product is also represented as a trace graph, and the entire graph including the time axis of each process and the trace graph, which corresponds to each product, is represented as a timeline graph.

The graph display unit 131 generates a timeline graph by referring to the log DB 121 when the operation information indicating that the display screen, which presents a manufacturing status, is to be displayed is input from the operating unit 112. Specifically, the graph display unit 131 generates a timeline graph that indicates the time elapsed from the start to the end in each of the manufacturing processes on the basis of the information on the start time and the end time of the manufacturing process. Furthermore, the graph display unit 131 displays the generated timeline graph on the display unit 111, each of the manufacturing processes being segmented in order of execution of the manufacturing processes and the time axes being aligned in an identical direction.

The graph display unit 131 acquires the start time and the end time of each product in each process from the log DB 121. The graph display unit 131 generates the time axes P1 to P8 that indicate the elapsed times in the respective processes and generates the line segment (trace graph) that connects the time axes for each product. Furthermore, the graph display unit 131 generates the time axes such that, for example, they are directed from the upper side of the timeline graph toward the lower side in chronological order. On the timeline graph, the interval between the time axes is equivalent to each process, and in the example of FIG. 3, the interval between the time axes P1 and P2 indicates the time needed for the process A. The graph display unit 131 generates a line segment for each product in the same manner.

The graph display unit 131 arranges the time axes P1 to P8 and the processes A to G in order of execution of processes, i.e., the order of the processes A to G in the example of FIGS. 2 and 3. The graph display unit 131 generates the display screen that includes the timeline graph, which is provided with the processes, the time axes, and the line segments, and outputs the generated display screen to the display unit 111 so as to display it. Furthermore, the display screen includes the timeline graph and an area for displaying the captured image of a camera. Moreover, the graph display unit 131 outputs the generated display screen to the identifying unit 133 and the image display unit 134.

Furthermore, the graph display unit 131 displays the area that is on the timeline graph and that indicates that the time elapsed from the start to the end of manufacturing for each product in a manufacturing process is in a predetermined state by being discriminable from the area that indicates that the predetermined state does not exist. In the example of FIG. 3, the area 11 and the area 12 are equivalent to the area that indicates that the predetermined state exists.

Furthermore, as the timeline graph, the graph display unit 131 may generate the graph where each process corresponds to a time axis and line segments connect the start times and the end times of the respective processes for the identical product. The graph includes, for example, the time axes that are arranged parallel to each other by being related to the respective processes. Furthermore, on the graph, for example, a line segment is provided to connect the positions that are adjacent to each other in order of manufacturing among the positions on the time axes that correspond to either the start time or the end time of the respective manufacturing processes for the identical product.

Specifically, on a first area of the screen, the graph display unit 131 displays the graph that includes the time axes that are arranged parallel to each other by being related to the respective processes; and the line segment that connects the positions that are adjacent to each other in order of manufacturing among the positions on the time axes that correspond to either the start time or the end time of the respective manufacturing processes for the identical product.

The receiving unit 132 receives designation of a trace graph area on the basis of the cursor position information, included in the operation information input from the operating unit 112, when the graph display unit 131 causes the display unit 111 to present the display screen. Specifically, the receiving unit 132 receives designation of a trace graph area that indicates manufacturing for any product in any manufacturing process within the displayed timeline graph. Furthermore, the receiving unit 132 receives designation of the area that indicates that a predetermined state exists. Furthermore, if the timeline graph is a graph where each process is related to a time axis, the receiving unit 132 receives designation of the line segment that connects the start times and the end times of the respective processes. In other words, the receiving unit 132 receives designation of a first line segment among the line segments displayed on the first area. Furthermore, the receiving unit 132 receives designation of the first line segment among the line segments that indicate that the predetermined state exists.

The receiving unit 132 compares the cursor position information with the coordinates on the display screen and determines whether a predetermined start operation has been performed. For example, if the left click operation of the mouse is performed as the predetermined start operation, the receiving unit 132 determines that it is the start operation for normal reproduction or range-specified reproduction and outputs normal/range-specified reproduction information to the identifying unit 133. For example, if the right click operation of the mouse is performed as the predetermined start operation, the receiving unit 132 determines that it is the start operation for comparative reproduction to make a comparison with a different image and outputs comparative-reproduction information to the identifying unit 133. Furthermore, if the comparison target is set, the receiving unit 132 receives designation of a trace graph area on the timeline graph after the comparative-reproduction information is output to the identifying unit 133. In other words, the receiving unit 132 further receives designation of a second line segment among the line segments displayed on the first area. The receiving unit 132 outputs the received designation of the area to the identifying unit 133.

The identifying unit 133 identifies the moving image to be reproduced on the basis of the trace graph area, of which the designation has been received by the receiving unit 132. A normal reproduction mode, a range-specified reproduction mode, and a comparative-reproduction mode are explained below as reproduction modes for a moving image.

(Typical or Range-Specified Reproduction Mode)

When the display screen is input from the graph display unit 131 and the normal/range-specified reproduction information is input from the receiving unit 132, the identifying unit 133 identifies the area where the left click operation, determined by the receiving unit 132, has been performed. Specifically, when the left click operation has been performed, the identifying unit 133 determines whether the area, i.e., abnormal area, which indicates that the time elapsed from the start to the end of manufacturing for each product in each process is in a predetermined state is being pointed. In the example of FIG. 3, it is determined whether the area 11 or the area 12, which is a trace graph, is being pointed. Furthermore, the predetermined state is, for example, a state where the operating time for the product exceeds the threshold for discriminating a predetermined abnormal value.

(Normal Reproduction Mode)

The identifying unit 133 transitions to the normal reproduction mode if no abnormal area is being pointed. In the normal reproduction mode, the identifying unit 133 first calculates the display-designated time and date in accordance with the point position indicated by the cursor position information. Furthermore, the identifying unit 133 identifies the display-designated process in accordance with the point position. Moreover, if the operating unit 112 is a touch panel, the point position is the point position indicated by a touch position.

The identifying unit 133 determines whether the point position is located on any of the processes on the basis of the calculated display-designated time and date and the identified display-designated process. If the point position is not located on any of the processes, the identifying unit 133 refers to the image DB 123 to acquire moving images of all the cameras on the display-designated time and date and outputs the acquired moving images to the image display unit 134.

If the point position is located on any of the processes, the identifying unit 133 refers to the camera definition table 122 to acquire the camera ID of the camera that is related to the process on which the point position is located, i.e., the display-designated camera. The identifying unit 133 determines whether either highlight or single display has been selected as a display mode in accordance with a selection status of a highlight button and a single display button provided on the display screen. If highlight has been selected, the identifying unit 133 refers to the image DB 123 to acquire moving images of all the cameras on the display-designated time and date and outputs the acquired moving images to the image display unit 134. Furthermore, the identifying unit 133 outputs the highlight command to the image display unit 134 so as to highlight the display frame of the moving image that is related to the acquired camera ID.

If single display has been selected, the identifying unit 133 refers to the image DB 123 to acquire the moving image related to the acquired camera ID on the display-designated time and date and outputs the acquired moving image to the image display unit 134. Furthermore, the identifying unit 133 refers to the camera definition table 122 to determine whether the mask item of the acquired camera ID is "true". If the mask item of the acquired camera ID is "true", the identifying unit 133 outputs the mask command to the image display unit 134 so as to mask the processes other than the process related to the acquired camera ID. Furthermore, the identifying unit 133 determines the size and the position of the mask in accordance with the items "X", "Y", "width", and "height" in the camera definition table 122. If the mask item of the acquired camera ID is not "true", the identifying unit 133 does not output any mask command. Furthermore, as for display areas of moving images, if highlight or single display has been selected, the identifying unit 133 may set different areas for highlight and single display or may selectively display each of them on the same area.

If both highlight and single display have been selected, the identifying unit 133 performs the same process as that in a case where highlight has been selected on the area for displaying moving images of all the cameras. Furthermore, the identifying unit 133 performs the same process as that in a case where single display has been selected on the area for displaying a moving image for single display. That is, a case where both highlight and single display have been selected is a case where moving images are displayed on different areas for highlight and single display.

In the normal reproduction mode, while a captured image is being displayed, that is, while a moving image is being reproduced, the identifying unit 133 determines whether the end of the moving image, i.e., the reproduction end time, has been reached or the operation information for a termination operation has been input from the operating unit 112. The identifying unit 133 continuously reproduces the moving image if the reproduction end time has not been reached or the operation information for a termination operation has not been input. The identifying unit 133 outputs a stop command to the image display unit 134 so as to stop reproducing the moving image if the reproduction end time has been reached or the operation information for a termination operation has been input.

(Range-Specified Reproduction Mode)

An explanation is given again of determination as to whether an abnormal area is being pointed. If an abnormal area is being pointed, the identifying unit 133 transitions to the range-specified reproduction mode. In the range-specified reproduction mode, the identifying unit 133 first calculates the display-designated time and date on the basis of the point position indicated by the cursor position information. Furthermore, the identifying unit 133 identifies the display-designated process on the basis of the point position. The identifying unit 133 refers to the camera definition table 122 to acquire the camera ID of the display-designated camera that is related to the identified display-designated process.

The identifying unit 133 refers to the log DB 121 on the basis of the calculated display-designated time and date and the identified display-designated process to acquire the start time and the end time of the identified display-designated process related to the line segment that corresponds to the abnormal area. The identifying unit 133 refers to the image DB 123 on the basis of the acquired start time and end time and the camera ID to acquire the captured image related to the line segment that corresponds to the abnormal area, i.e., the moving image of the process that is the abnormal area, and outputs the acquired moving image to the image display unit 134.

The identifying unit 133 determines whether either highlight or single display has been selected as a display mode in accordance with a selection status of the highlight button and the single display button provided on the display screen. As the process based on determination as to whether either highlight or single display has been selected as a display mode is the same as that in the normal reproduction mode, its explanation is omitted.

In the range-specified reproduction mode, while a captured image is being displayed, that is, while a moving image is being reproduced, the identifying unit 133 determines whether the end time of the process that is the abnormal area in the moving image has been reached or the operation information for a termination operation has been input from the operating unit 112. The identifying unit 133 continuously reproduces the moving image if the end time of the process that is the abnormal area has not been reached or the operation information for a termination operation has not been input. The identifying unit 133 outputs a stop command to the image display unit 134 so as to stop reproducing the moving image if the end time of the process that is the abnormal area has been reached or the operation information for a termination operation has been input.

(Comparative Reproduction Mode)

An explanation is given again of determination based on the information input from the receiving unit 132. When the display screen is input from the graph display unit 131 and the comparative-reproduction information is input from the receiving unit 132, the identifying unit 133 identifies the area where the right click operation, determined by the receiving unit 132, has been performed. Specifically, the identifying unit 133 determines whether the area, i.e., abnormal area, which indicates that the time elapsed from the start to the end of manufacturing for each product in each process is in a predetermined state is being pointed when the right click operation was performed.

If no abnormal area is being pointed, the identifying unit 133 again determines whether a predetermined start operation for the receiving unit 132 has been performed. The identifying unit 133 transitions to the comparative-reproduction mode if an abnormal area is being pointed. In the comparative-reproduction mode, the identifying unit 133 first calculates the display-designated time and date on the basis of the point position indicated by the cursor position information. Furthermore, the identifying unit 133 identifies the display-designated process on the basis of the point position. Furthermore, the identifying unit 133 refers to the camera definition table 122 to acquire the camera ID of the display-designated camera that is related to the identified display-designated process. Moreover, the identifying unit 133 causes a context menu to be displayed at the cursor position.

The context menu includes items such as standard value, average value, shortest value, or free selection, which is the target to be compared. The standard value is, for example, the item for selecting the moving image that corresponds to the standard operating time of the identified display-designated process. The average value is, for example, the item for selecting the moving image that corresponds to the average operating time during a period such as one day, one week, or one month with regard to the identified display-designated process. The shortest value is, for example, the item for selecting the moving image in a case where the operating time is shortest, i.e., the operation is quickest with regard to the identified display-designated process. Free choice is, for example, the item for selecting the moving image of a different product in the same process as the identified display-designated process. That is, as the target to be compared, various moving images are available, such as the moving image that serves as a model for each process or the moving image of an operation of a worker for a different product in the same process on one day.

The identifying unit 133 receives selection for an item in the context menu. After selection for the item in the context menu is received, the identifying unit 133 generates a comparative-reproduction window. On the comparative-reproduction window, two moving image areas are provided to reproduce the moving image of the identified display-designated process and the moving image that is the comparison target, respectively, together with the set attribute information on the moving images. Furthermore, for example, the items in the context menu are usable as the attribute information. Furthermore, on each moving image area, the color of the frame or the background may be identical to the color of the abnormal area on the timeline graph or the color may be changed in accordance with the attribute information such as the average value or the standard value. Moreover, on each moving image area, the number that indicates a selection order may be also displayed if the comparison target is free selection.

The identifying unit 133 determines whether the received selection is free selection or other than free selection, i.e., the standard value, the average value, or the shortest value. If the received selection is other than free selection, the identifying unit 133 refers to the image DB 123 to set the moving image with the standard value, the average value, or the shortest value that is preset in relation to the received selection item on one of the moving image areas of the comparative-reproduction window.

Furthermore, the identifying unit 133 refers to the log DB 121 on the basis of the calculated display-designated time and date and the identified display-designated process to acquire the start time and the end time of the identified display-designated process related to the line segment that corresponds to the abnormal area. The identifying unit 133 refers to the image DB 123 on the basis of the acquired start time and end time and the camera ID to acquire the captured image related to the line segment that corresponds to the abnormal area, i.e., the moving image of the process that is the abnormal area, and sets the acquired moving image on the other one of the moving image areas on the comparative-reproduction window. The identifying unit 133 outputs the comparative-reproduction window, on which the setting of the moving images on the moving image areas has been completed, to the image display unit 134 and starts to reproduce the moving images. Furthermore, as for reproduction of each moving image, the identifying unit 133 may start reproduction by synchronizing the start time of manufacturing in the process. That is, the identifying unit 133 may simultaneously start to reproduce each moving image for example at the start time of manufacturing in the process.

If the received selection is free selection, the identifying unit 133 performs a comparison-target setting process. During the comparison-target setting process, the identifying unit 133 first outputs a comparison-candidate highlight command to the image display unit 134 so as to highlight a trace graph area other than the pointed abnormal area during the identical process, i.e., a trace graph area of a product that is different from the product that corresponds to the pointed abnormal area during the identical process.

The identifying unit 133 determines whether a highlighted trace graph area of a different product during the identical process has been selected on the basis of designation of the area input from the receiving unit 132. If the area has not been selected, the identifying unit 133 stands by until it is selected. If the area has been selected, the identifying unit 133 sets the selected area as the comparison target. After the area is set as the comparison target, the identifying unit 133 outputs a highlight termination command to undo the highlighted area to the image display unit 134. After the comparison target is completely set, the identifying unit 133 terminates the comparison-target setting process.

After the comparison target is set in the comparison-target setting process, the identifying unit 133 refers to the image DB 123 to set the moving image of the area that is set as the comparison target on one of the moving image areas of the comparative-reproduction window. Furthermore, in the same manner as the case where other than free selection is selected from the context menu, the identifying unit 133 acquires the moving image of the process that is the pointed abnormal area and sets the acquired moving image on the other one of the moving image areas of the comparative-reproduction window. The identifying unit 133 outputs the comparative-reproduction window, on which the setting of the moving images on the moving image areas has been completed, to the image display unit 134, thereby starting to reproduce the moving images. Furthermore, as for reproduction of each moving image, the identifying unit 133 may start reproduction by synchronizing the start time of manufacturing in the process.

In the comparative-reproduction mode, the identifying unit 133 determines whether an operation to close the comparative-reproduction window has been input while the captured image is being displayed, i.e., while the moving image is being reproduced. If the operation to close the comparative-reproduction window has not been input, the identifying unit 133 continues reproduction on the comparative-reproduction window. If the operation to close the comparative-reproduction window has been input, the identifying unit 133 outputs a window close command to the image display unit 134 so as to close the comparative-reproduction window and return to the display screen that presents the timeline graph and a moving image. Furthermore, if the moving image reproduced on the comparative-reproduction window has been reproduced until the end, the identifying unit 133 stands by until an operation to close the comparative-reproduction window is input.

Furthermore, the identifying unit 133 determines whether the operation information indicating that the display is to be terminated is input from the operating unit 112 while the display screen for the timeline graph and the moving image is being displayed. If the operation information indicating that the display is to be terminated is not input, the identifying unit 133 continuously displays the display screen for the timeline graph and the moving image. If the operation information indicating that the display is to be terminated is input, the identifying unit 133 outputs a termination command to the image display unit 134 so as to terminate display of the display screen for the timeline graph and the moving image.

The image display unit 134 receives input of the display screen from the graph display unit 131. When a moving image is input from the identifying unit 133, the image display unit 134 updates the display screen such that the moving image is presented on the area of the display screen for displaying moving images of the cameras. Furthermore, when a highlight command is input from the identifying unit 133, the image display unit 134 updates the display screen such that the display frame of the moving image that corresponds to the highlight command is highlighted. Furthermore, when a mask command is input from the identifying unit 133, the image display unit 134 refers to the camera definition table 122 to update the display screen such that the mask that corresponds to the mask command is depicted.

Furthermore, when a stop command is input from the identifying unit 133, the image display unit 134 stops reproducing the moving image. Furthermore, when the comparative-reproduction window is input from the identifying unit 133, the image display unit 134 displays the input comparative-reproduction window on the display screen in a superimposed manner. Furthermore, when a window close command is input from the identifying unit 133, the image display unit 134 closes the comparative-reproduction window and updates the display screen. Furthermore, when a comparison-candidate highlight command is input from the identifying unit 133, the image display unit 134 updates the display screen such that the corresponding area of the trace graph that is a comparison target candidate on the timeline graph is highlighted. Furthermore, when a highlight termination command is input from the identifying unit 133, the image display unit 134 updates the display screen so as to undo the highlighted trace graph area, which is a comparison target candidate, on the timeline graph. Moreover, when a termination command is input from the identifying unit 133, the image display unit 134 terminates display of the display screen.

Here, the identifying unit 133 and the image display unit 134 may be a single image display unit. Specifically, among the captured images for manufacturing processes, stored in the image DB 123, the image display unit reproduces the captured image that corresponds to the start time to the end time of manufacturing for a specific product in a specific manufacturing process, specified by the area of which designation has been received. Furthermore, with regard to each of the areas of which designation has been received, the image display unit displays the captured image that is captured at the corresponding time in the corresponding manufacturing process in such a manner so as to determine which area the captured image corresponds to. Moreover, the image display unit starts to reproduce the captured image that corresponds to each of the areas by synchronizing the start time of manufacturing specified by each of the areas.

Furthermore, the image display unit is applicable to generation of a graph where each process corresponds to a time axis and line segments connect the start times and the end times of the respective processes for the identical product. Specifically, on the second area of the screen, the image display unit displays the image captured in the time interval specified by the first line segment in the process that corresponds to the first line segment of which designation has been received. Furthermore, among the line segments on the graph, the image display unit displays the line segment that indicates that the time elapsed from the start to the end of manufacturing for each product in a process is in a predetermined state by being discriminable from the line segment that indicates that the predetermined state does not exist. Furthermore, with regard to each of the first line segment and the second line segment, the image display unit displays the image that is captured at the corresponding time in the corresponding process in such a manner so as to determine which line segment the image corresponds to. Moreover, the image display unit starts to reproduce a first image that corresponds to the first line segment and a second image that corresponds to the second line segment by synchronizing the start time of manufacturing specified by the first line segment and the start time of manufacturing specified by the second line segment.

Figure 7:
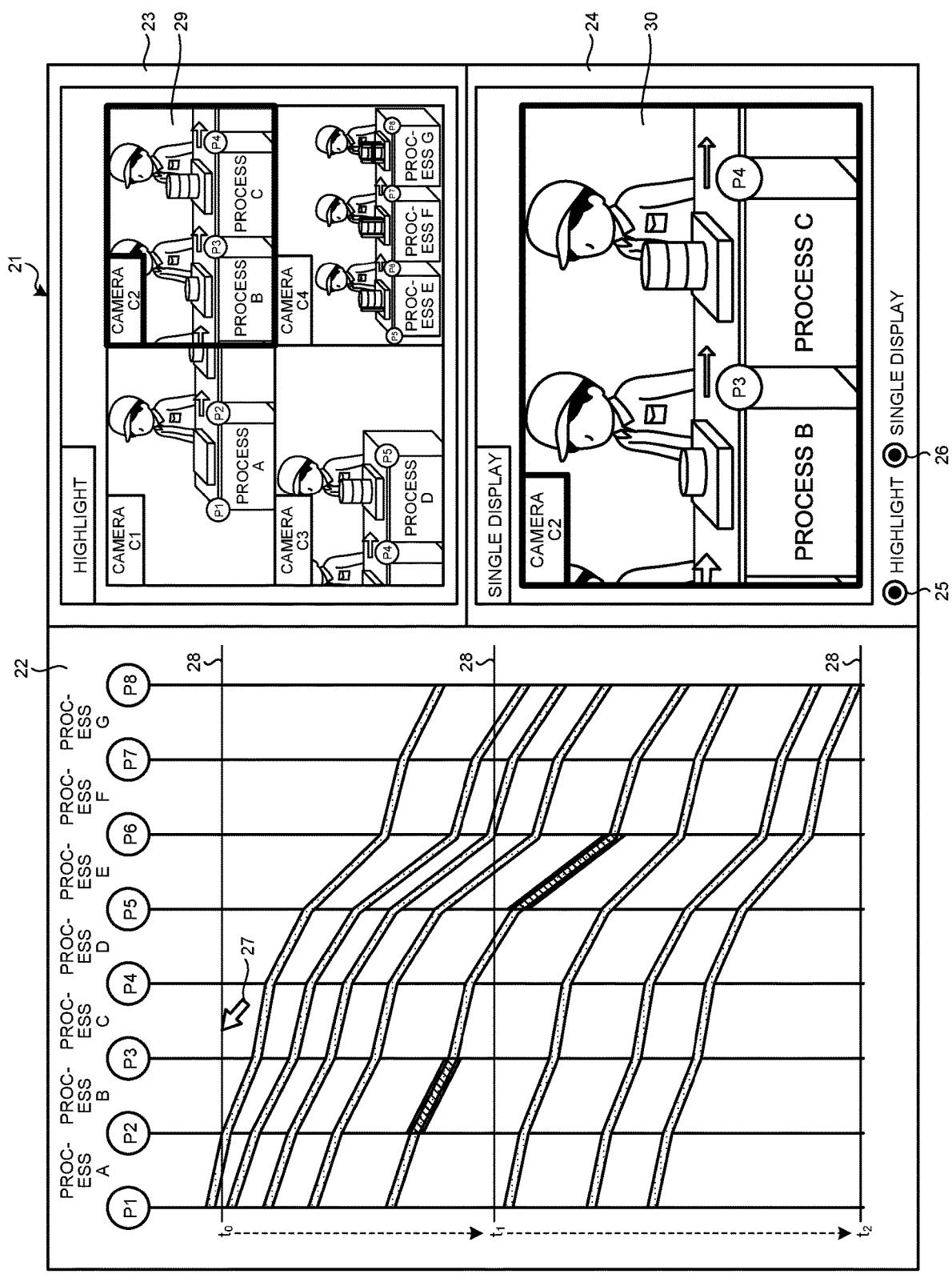
FIG. 7 is a diagram that illustrates an example of a display screen in the normal reproduction mode.
Figure 8:
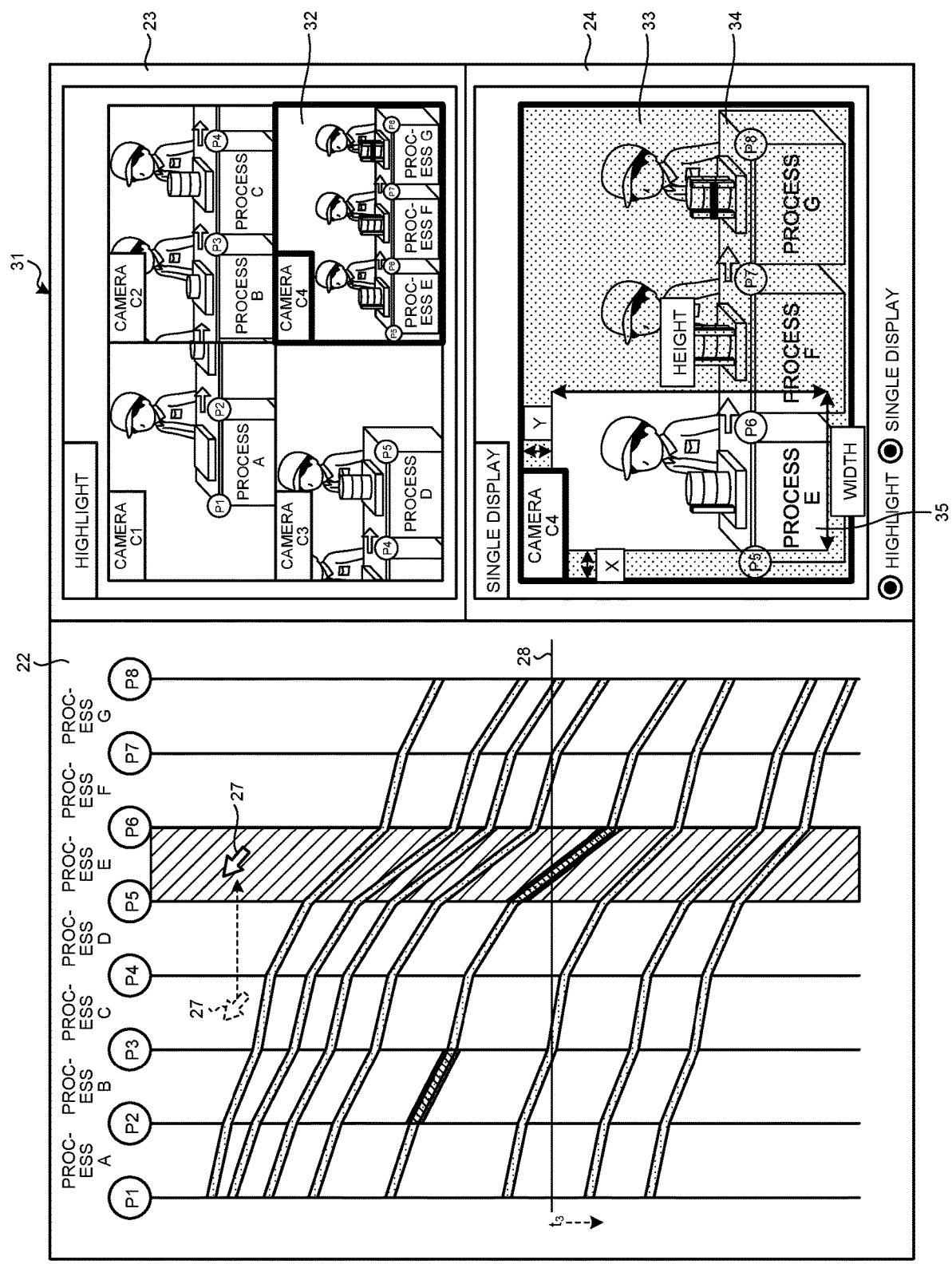
FIG. 8 is a diagram that illustrates another example of the display screen in the normal reproduction mode.

Here, with reference to FIGS. 7 and 8, an explanation is given of an example of the display screen in the normal reproduction mode. Furthermore, in FIGS. 7 and 8, highlight and single display are selected as a display mode. FIG. 7 is a diagram that illustrates an example of the display screen in the normal reproduction mode. As illustrated in FIG. 7, a display screen 21 is an example of the display screen in the normal reproduction mode, and it includes an area 22 that displays the timeline graph; an area 23 that displays moving images of all the cameras; and an area 24 that displays only the moving image of the camera that is related to the process that corresponds to the point position. For example, if there are four cameras, the area 23 is divided by four, and each area displays the moving image that is related to each camera. Furthermore, the display screen 21 includes a highlight button 25 and a single display button 26 for selecting a display mode.

As illustrated in FIG. 7, on the display screen 21, a cursor 27 is located on the process C, and the moving image at time $t_0$, indicated by a line 28 that correspond to the position of the cursor 27, is displayed on the area 23 and the area 24. On the area 23, a moving image 29 of the camera C2, which is related to the process C, is highlighted by, for example, making the display frame thick and coloring it. Furthermore, on the area 24, a moving image 30 of the camera C2 is displayed alone. Moreover, the area 24 may be highlighted by making the display frame thick and coloring it when it is displayed alone.

On the display screen 21, the area pointed by performing the left click operation is the time $t_0$ on the process C; therefore, reproduction of the moving image is started at the pointed time $t_0$ as a start time. On the display screen 21, after reproduction of the moving image is started at the time $t_0$, the line 28 moves to time $t_1$ and then time $t_2$ in accordance with the capturing time and date of the moving image. At this time, the moving image on the capturing time and date, indicated by the line 28, is reproduced on the area 23 and the area 24. Furthermore, on the display screen 21, reproduction of the moving image is stopped when the moving image has been reproduced up to the end, i.e., the reproduction end time has been reached, or the operation information for a termination operation has been input from the operating unit 112.

FIG. 8 is a diagram that illustrates another example of the display screen in the normal reproduction mode. As illustrated in FIG. 8, a display screen 31 is an example of the case where the moving image displayed on the area 24 for single display is changed in accordance with the cursor position in the normal reproduction mode. Furthermore, on the display screen 31, the moving image at time $t_3$, indicated by the line 28, is displayed on the area 23 and the area 24. Moreover, on the display screen 31, the line 28 moves along the time axis and, in accordance with movement of the line 28, the moving image displayed on the area 23 and the area 24 is also changed.

Furthermore, on the display screen 31, for example, if the cursor 27 moves from the process C to the process E, a moving image 32 of the camera C4, which is related to the process E, is highlighted on the area 23. Furthermore, on the area 24, the displayed moving image is changed from the moving image of the camera C2, which is related to the process C, to a moving image 33 of the camera C4, which is related to the process E. On the moving image 33, a mask 34 is displayed to mask other than an area 35 that is related to the process E so that it is possible to easily determine the process E and the product that is in the process E at the time $t_3$. Moreover, on the display screen 31, the area for the process E on the timeline graph is displayed due to for example coloring such that it is discriminable from other processes, whereby it is possible to easily determine which process is highlighted and displayed alone.

Figure 9:
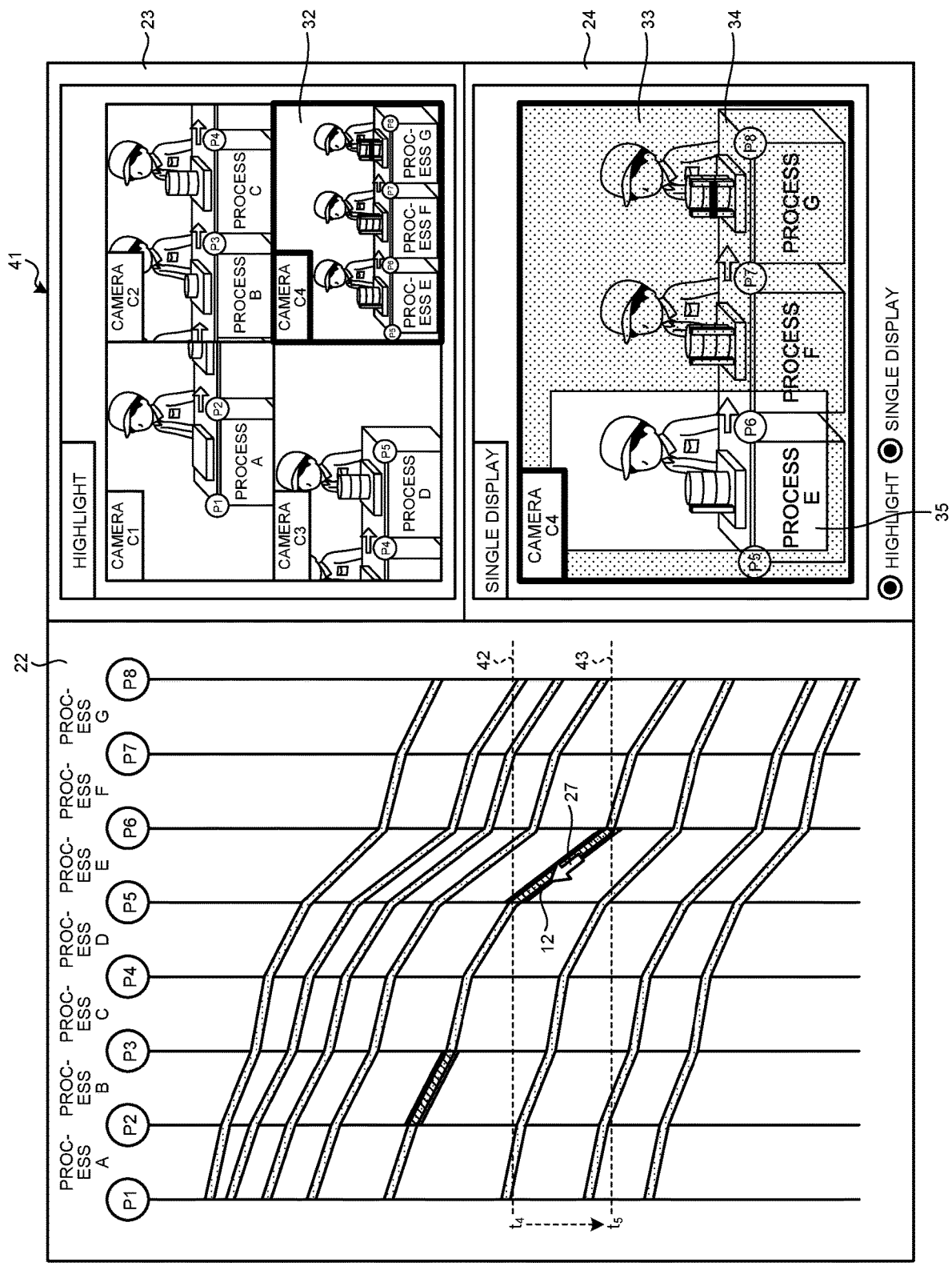
FIG. 9 is a diagram that illustrates an example of the display screen in the range-specified reproduction mode.
Figure 10:
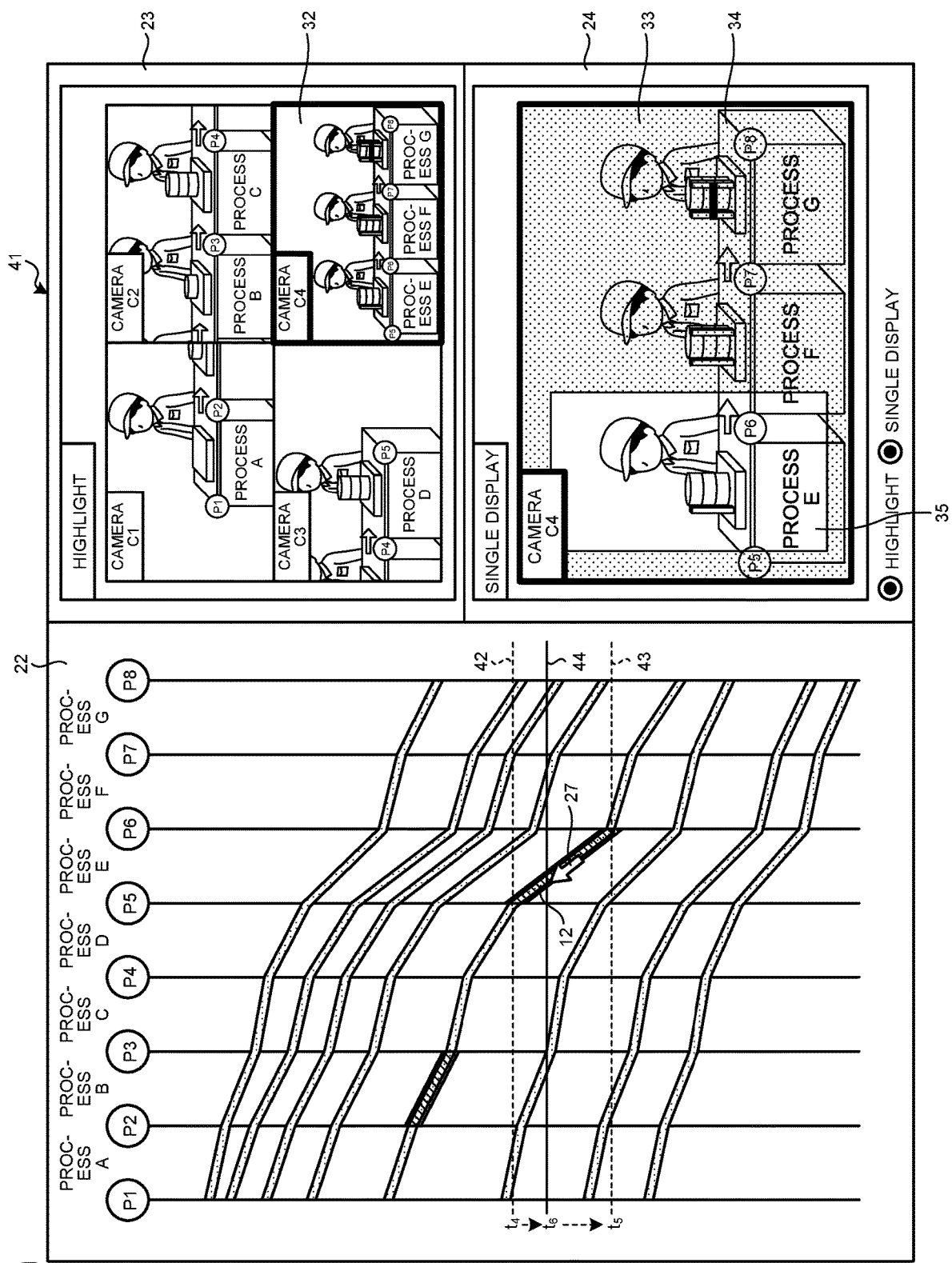
FIG. 10 is a diagram that illustrates another example of the display screen in the range-specified reproduction mode.

Next, with reference to FIGS. 9 and 10, an explanation is given of an example of the display screen in the range-specified reproduction mode. Here, in FIGS. 9 and 10, highlight and single display are selected as a display mode. FIG. 9 is a diagram that illustrates an example of the display screen in the range-specified reproduction mode. As illustrated in FIG. 9, a display screen 41 is an example of the display screen in the range-specified reproduction mode, and it includes the area 22, the area 23, and the area 24, as is the case with the display screen 21 illustrated in FIG. 7.

As illustrated in FIG. 9, on the display screen 41, when a left click operation is performed while the cursor 27 is pointing the area 12 that is an abnormal area, reproduction of the moving image of the process E, which is related to the area 12, is started at time $t_4$, which is the start time of the area 12. Specifically, on the area 23, the moving image 32 of the camera C4, which is related to the process E, is highlighted by for example making the display frame thick and coloring it. Furthermore, on the area 24, the moving image 33 of the camera C4 is displayed alone. Here, the area 24 may be highlighted by making the display frame thick and coloring it, or the like, while it is displayed alone. Moreover, only the moving image of the process E, which corresponds to the area 12, is reproduced on the display screen 41. That is, the moving image from the time $t_4$, indicated by a line 42, to time $t_5$, which is the end time of the area 12 and is indicated by a line 43, is reproduced on the display screen 41.

FIG. 10 is a diagram that illustrates another example of the display screen in the range-specified reproduction mode. The display screen 41 illustrated in FIG. 10 is an example where reproduction of the moving image has been started on the display screen 41 of FIG. 9 and the moving image is being reproduced. On the display screen 41, after reproduction of the moving image is started at the time $t_4$, a line 44 moves to time $t_6$ and the time $t_5$ in accordance with the capturing time and date of the moving image. At this time, the moving image on the capturing time and date indicated by the line 44 is reproduced on the area 23 and the area 24. Furthermore, on the display screen 41, reproduction of the moving image is stopped when the moving image of the process E, which is related to the area 12, has been reproduced up to the end, i.e., the end time of the process that is an abnormal area has been reached, or the operation information for a termination operation has been input from the operating unit 112.

Figure 11:
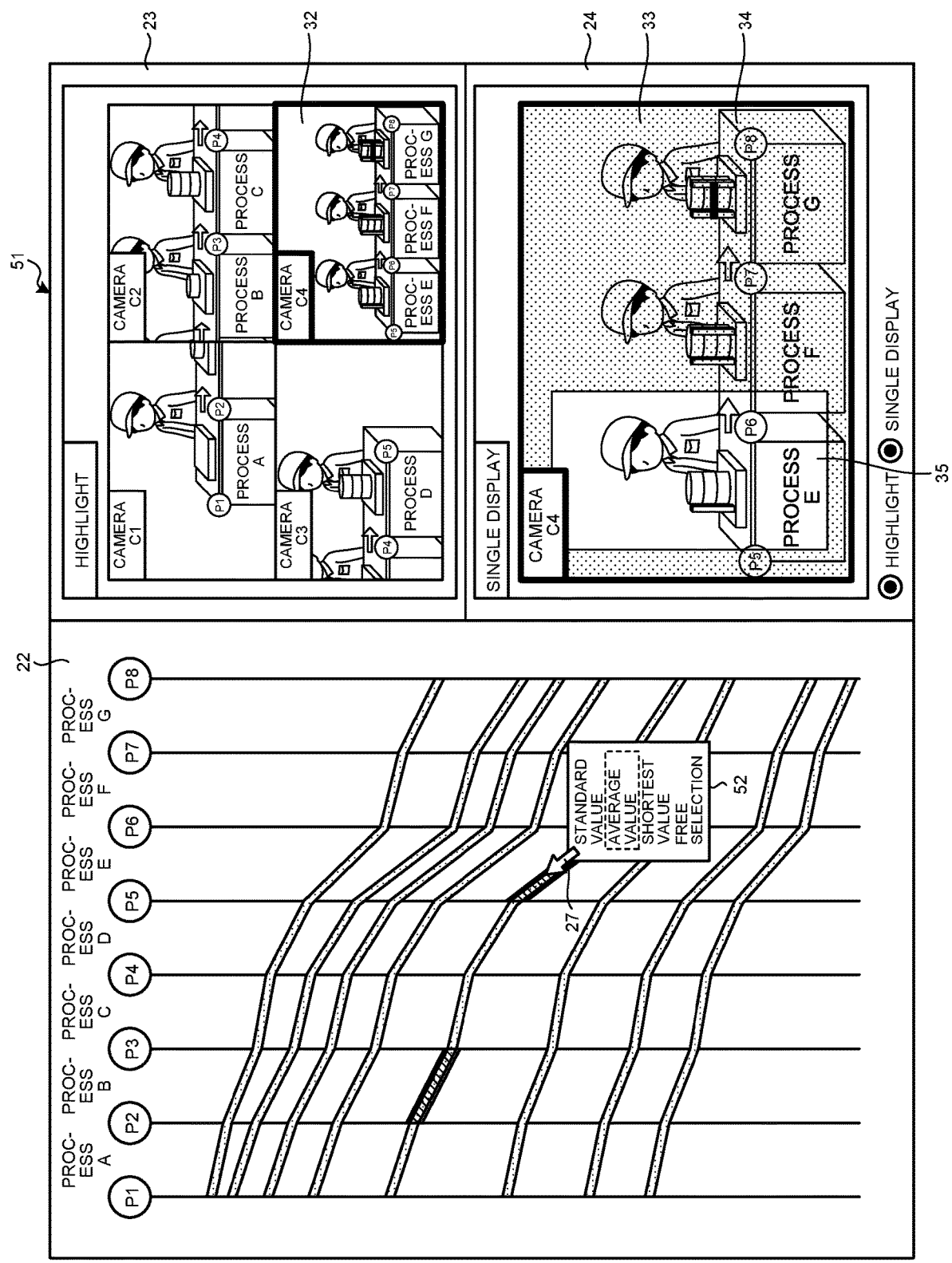
FIG. 11 is a diagram that illustrates an example of the display screen in the comparative-reproduction mode.
Figure 12:
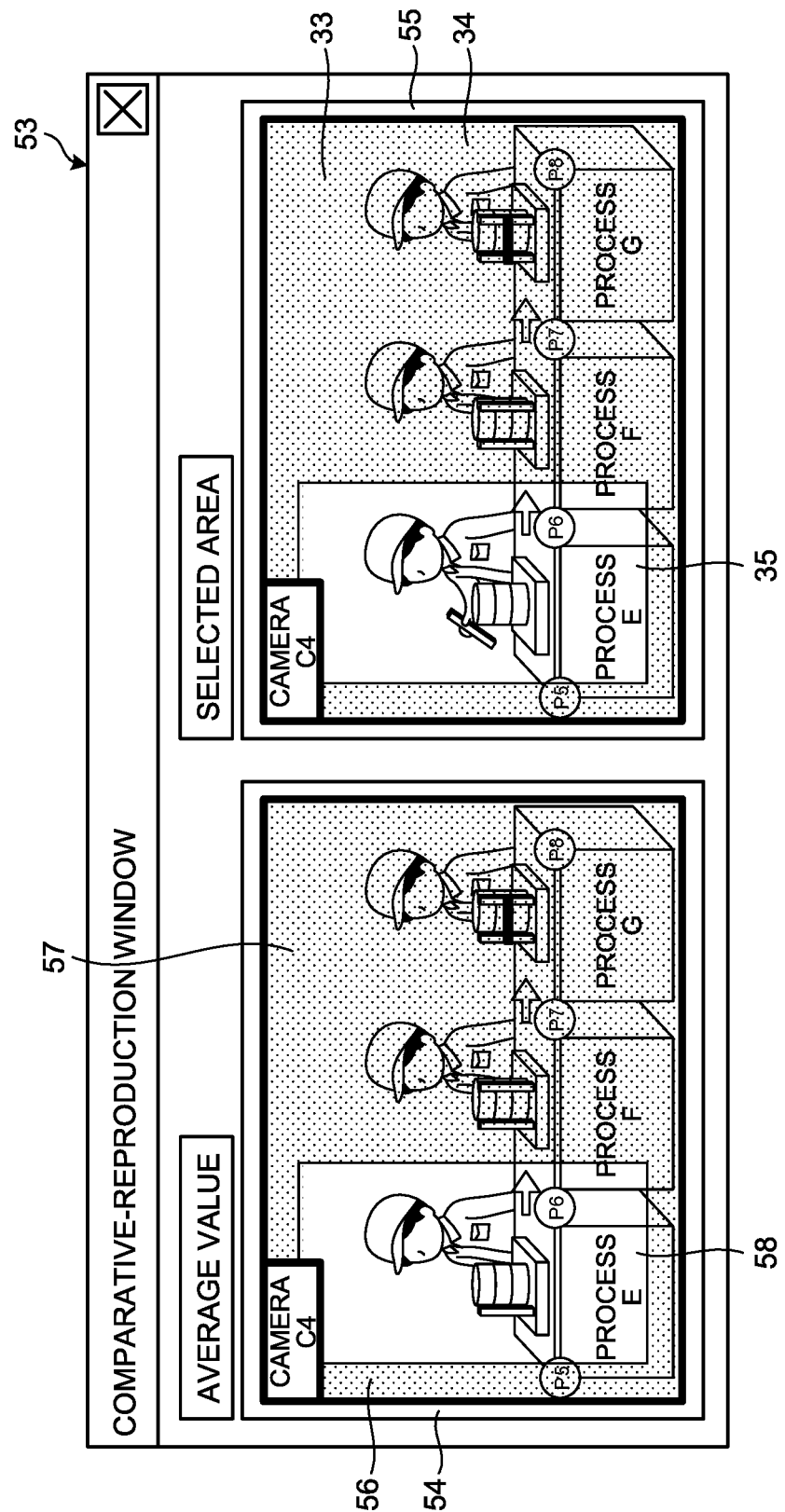
FIG. 12 is a diagram that illustrates an example of the display screen of a comparative-reproduction window.

Next, with reference to FIGS. 11 and 12, an explanation is given of an example of the display screen in the comparative-reproduction mode. Here, in FIGS. 11 and 12, highlight and single display are selected as a display mode. FIG. 11 is a diagram that illustrates an example of the display screen in the comparative-reproduction mode. As illustrated in FIG. 11, a display screen 51 is an example of the display screen in the comparative-reproduction mode, and it includes the area 22, the area 23, and the area 24, as is the case with the display screen 21 illustrated in FIG. 7.

As illustrated in FIG. 11, on the display screen 51, after a right click operation is performed while the cursor 27 is pointing the area 12 that is an abnormal area, a context menu 52 is displayed. Any one of the items is selected from the context menu 52. On the display screen 51, for example, if the average value is selected, the comparative-reproduction window is displayed on the display screen 51 in a superimposed manner.

FIG. 12 is a diagram that illustrates an example of the display screen of the comparative-reproduction window. A comparative-reproduction window 53 illustrated in FIG. 12 includes an area 54 that displays the moving image that is a comparison target and an area 55 that displays the moving image of the selected area. If the average value is selected from the context menu 52 on the display screen 51 of FIG. 11, for example, a moving image 56 that is related to the average value of the operating time is set on the area 54 of the comparative-reproduction window 53. Furthermore, on the comparative-reproduction window 53, a mask 57 is displayed for a moving image 56 to mask other than an area 58 of the process E.

Furthermore, on the comparative-reproduction window 53, for example, the moving image 33 of the selected area is set on the area 55, and the mask 34 is displayed on the moving image 33 to mask other than the area 35 of the process E that is related to the area 12. On the comparative-reproduction window 53, reproduction of a moving image 56 set on the area 54 and the moving image 33 set on the area 55 is started. In the example of FIG. 12, reproduction is started in synchronization with the start time of manufacturing in the process E, and a state is such that the manufacturing task for the product, which is related to the area 12 that is the selected area, is behind the average value. On the comparative-reproduction window 53, if an operation to close the comparative-reproduction window 53 is input, the comparative-reproduction window 53 is closed and the display screen 51 is set again.

Figure 13:
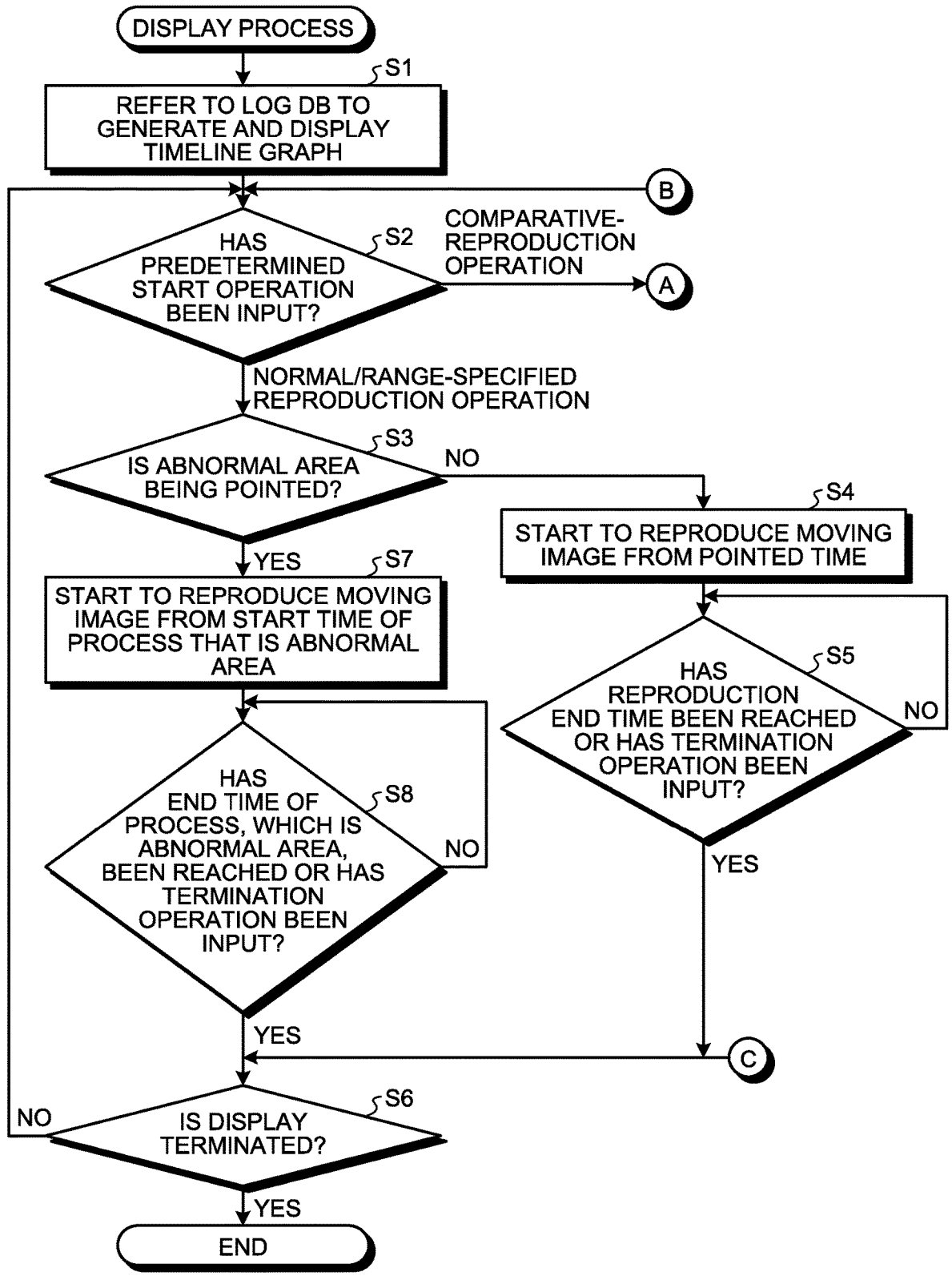
FIG. 13 is a flowchart that illustrates an example of a display process according to the embodiment.
Figure 14:
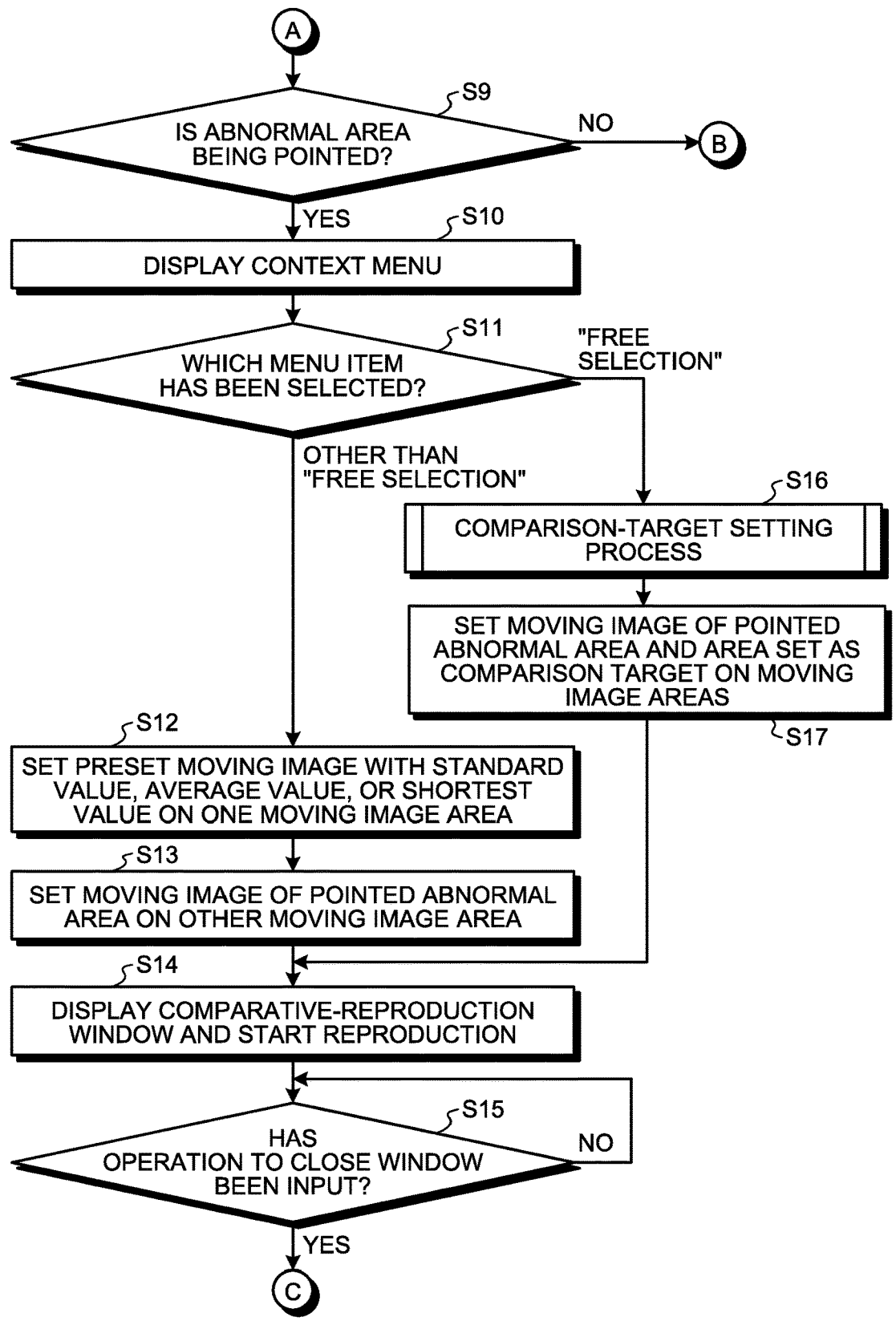
FIG. 14 is a flowchart that illustrates an example of the display process according to the embodiment.

Next, operation of the management device 100 according to the embodiment is explained. FIGS. 13 and 14 are flowcharts that illustrate an example of the display process according to the embodiment.

When the operation information for presenting the display screen, which displays a manufacturing status, is input from the operating unit 112, the graph display unit 131 refers to the log DB 121 to generate a timeline graph (Step S1). The graph display unit 131 generates the display screen that includes the generated timeline graph and outputs the generated display screen to the display unit 111 so as to display it. Furthermore, the graph display unit 131 outputs the generated display screen to the identifying unit 133 and the image display unit 134.

After the graph display unit 131 causes the display unit 111 to present the display screen, the receiving unit 132 compares the cursor position information, included in the operation information input from the operating unit 112, with the coordinates on the display screen and determines whether a predetermined start operation has been input (Step S2). For example, if a left click operation of the mouse is performed as the predetermined start operation (Step S2: normal/range-specified reproduction operation), the receiving unit 132 determines that it is the start operation for normal reproduction or range-specified reproduction and outputs normal/range-specified reproduction information to the identifying unit 133.

After the display screen is input from the graph display unit 131 and the normal/range-specified reproduction information is input from the receiving unit 132, the identifying unit 133 determines whether an abnormal area is being pointed (Step S3). If an abnormal area is not being pointed (Step S3: No), the identifying unit 133 transitions to the normal reproduction mode.

The identifying unit 133 refers to the image DB 123 to acquire the moving image that corresponds to the pointed time and outputs the acquired moving image to the image display unit 134. After the display screen is input from the graph display unit 131 and the moving image is input from the identifying unit 133, the image display unit 134 displays the moving image on the area, which displays camera's moving images, of the display screen and starts to reproduce the moving image from the pointed time (Step S4).

In the normal reproduction mode, the identifying unit 133 determines whether the reproduction end time has been reached or the operation information for a termination operation has been input from the operating unit 112 while the moving image is being reproduced (Step S5). If the reproduction end time has not been reached or the operation information for a termination operation has not been input (Step S5: No), the identifying unit 133 continuously reproduces the moving image and repeatedly makes a determination at Step S5.

If the reproduction end time has been reached or the operation information for a termination operation has been input (Step S5: Yes), the identifying unit 133 outputs a stop command to the image display unit 134 so as to stop reproducing the moving image. When the stop command is input from the identifying unit 133, the image display unit 134 stops reproducing the moving image. The identifying unit 133 determines whether the operation information indicating that the display is to be terminated has been input from the operating unit 112 (Step S6). Specifically, the identifying unit 133 determines whether the operation information indicating that the display is to be terminated has been input from the operating unit 112 while the display screen of the timeline graph and the captured image is being displayed.

If the operation information indicating that the display is to be terminated has not been input (Step S6: No), the identifying unit 133 returns to Step S2. If the operation information indicating that the display is to be terminated has been input (Step S6: Yes), the identifying unit 133 outputs a termination command to the image display unit 134 so as to terminate displaying the display screen of the timeline graph and the captured image. After the termination command is input from the identifying unit 133, the image display unit 134 terminates displaying the display screen.

Step S3 is explained again. If an abnormal area is being pointed (Step S3: Yes), the identifying unit 133 transitions to the range-specified reproduction mode. The identifying unit 133 refers to the image DB 123 to acquire the moving image of the process that is an abnormal area and outputs the acquired moving image to the image display unit 134. After the display screen is input from the graph display unit 131 and the moving image is input from the identifying unit 133, the image display unit 134 displays the moving image on the area, which displays camera's moving images, of the display screen and starts to reproduce the moving image from the start time of the process that is an abnormal area (Step S7).

In the range-specified reproduction mode, the identifying unit 133 determines whether the end time of the process, which is an abnormal area in the moving image, has been reached or the operation information for a termination operation has been input from the operating unit 112 while the moving image is being reproduced (Step S8). If the end time of the process, which is an abnormal area, has not been reached or the operation information for a termination operation has not been input (Step S8: No), the identifying unit 133 continuously reproduces the moving image and repeatedly makes a determination at Step S8.

If the end time of the process, which is an abnormal area, has been reached or the operation information for the termination operation has been input (Step S8: Yes), the identifying unit 133 outputs a stop command to the image display unit 134 so as to stop reproducing the moving image. After the stop command is input from the identifying unit 133, the image display unit 134 stops reproducing the moving image. The identifying unit 133 determines whether the operation information indicating that the display is to be terminated has been input from the operating unit 112 (Step S6).

If the operation information indicating that the display is to be terminated has not been input (Step S6: No), the identifying unit 133 returns to Step S2. If the operation information indicating that the display is to be terminated has been input (Step S6: Yes), the identifying unit 133 outputs a termination command to the image display unit 134 so as to terminate display of the display screen of the timeline graph and the captured image. After a termination command is input from the identifying unit 133, the image display unit 134 terminates display of the display screen.

Step S2 is explained again. For example, if a right click operation of the mouse is performed as the predetermined start operation (Step S2: comparative-reproduction operation), the receiving unit 132 determines that it is the start operation for comparative reproduction and outputs the comparative-reproduction information to the identifying unit 133. After the display screen is input from the graph display unit 131 and the comparative-reproduction information is input from the receiving unit 132, the identifying unit 133 determines whether an abnormal area is being pointed (Step S9). If no abnormal area is being pointed (Step S9: No), the identifying unit 133 returns to Step S2.

If an abnormal area is being pointed (Step S9: Yes), the identifying unit 133 transitions to the comparative-reproduction mode. The identifying unit 133 causes the context menu to be displayed on the cursor position (Step S10). The identifying unit 133 receives selection of an item in the context menu. After selection of an item in the context menu is received, the identifying unit 133 generates the comparative-reproduction window.

The identifying unit 133 determines whether which menu item has been selected from the context menu (Step S11). Specifically, the identifying unit 133 determines whether the received selection is free selection or other than free selection. If the received selection is other than free selection (Step S11: other than "free selection"), the identifying unit 133 acquires the preset moving image with the standard value, average value, or shortest value that corresponds to the selected item, which has been received, from the image DB 123. The identifying unit 133 sets the acquired moving image on one of the moving image areas of the comparative-reproduction window (Step S12).

The identifying unit 133 acquires the moving image of the process that is the pointed abnormal area from the image DB 123. The identifying unit 133 sets the acquired moving image on the other one of the moving image areas of the comparative-reproduction window (Step S13). The identifying unit 133 outputs the comparative-reproduction window where the moving images have been completely set on the moving image areas to the image display unit 134. After the comparative-reproduction window is input from the identifying unit 133, the image display unit 134 displays the input comparative-reproduction window on the display screen in a superimposed manner and starts to reproduce the moving images (Step S14).

The identifying unit 133 determines whether an operation to close the comparative-reproduction window has been input while the moving images are being reproduced in the comparative-reproduction mode (Step S15). If an operation to close the comparative-reproduction window has not been input (Step S15: No), the identifying unit 133 continues reproduction on the comparative-reproduction window and repeatedly makes a determination at Step S15. If an operation to close the comparative-reproduction window has been input (Step S15: Yes), the identifying unit 133 outputs a window close command to the image display unit 134. After the window close command is input from the identifying unit 133, the image display unit 134 closes the comparative-reproduction window, updates the display screen, and proceeds to Step S6.

Figure 15:
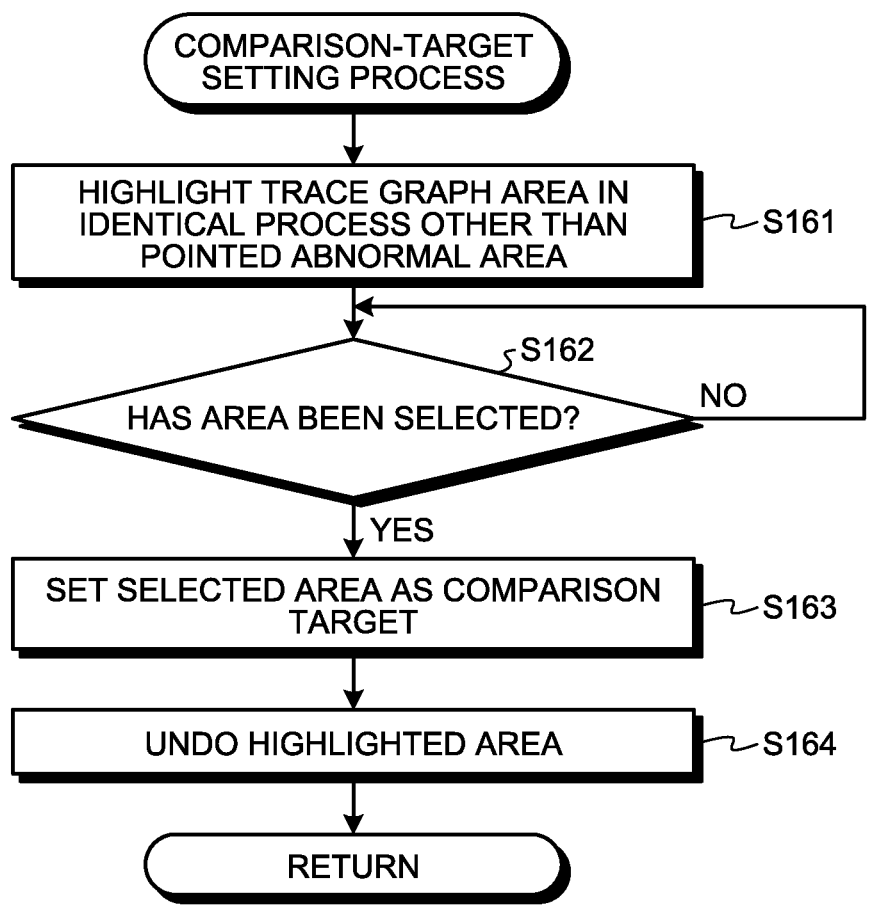
FIG. 15 is a flowchart that illustrates an example of a comparison-target setting process.

Step S11 is explained again. If the received selection is free selection (Step S11: "free selection"), the identifying unit 133 performs a comparison-target setting process (Step S16). Here, with reference to FIG. 15, the comparison-target setting process is explained. FIG. 15 is a flowchart that illustrates an example of the comparison-target setting process.

The identifying unit 133 outputs a comparison-candidate highlight command to the image display unit 134 so as to highlight a trace graph area in the identical process other than the pointed abnormal area. After the comparison-candidate highlight command is input from the identifying unit 133, the image display unit 134 updates the display screen such that the corresponding trace graph area, which is a comparison target candidate, on the timeline graph is highlighted (Step S161).

The receiving unit 132 receives designation of a trace graph area on the timeline graph. The receiving unit 132 outputs the received designation of the area to the identifying unit 133. The identifying unit 133 determines whether the highlighted trace graph area has been selected in the identical process other than the pointed abnormal area in accordance with designation of the area that has been input from the receiving unit 132 (Step S162). If the area has not been selected (Step S162: No), the identifying unit 133 repeatedly makes a determination at Step S162.

If the area has been selected (Step S162: Yes), the identifying unit 133 sets the selected area as a comparison target (Step S163). After the area that is a comparison target is set, the identifying unit 133 outputs a highlight termination command to the image display unit 134 so as to undo the highlighted area. After the highlight termination command is input from the identifying unit 133, the image display unit 134 updates the display screen so as to undo the highlighted trace graph area, which is a comparison target candidate, on the timeline graph (Step S164), terminates the comparison-target setting process, and returns to the previous process. Thus, the management device 100 may select other areas on the timeline graph as comparison targets in the comparative-reproduction mode.

The display process in FIGS. 13 and 14 is explained again. After the comparison target is set in the comparison-target setting process, the identifying unit 133 refers to the image DB 123 to set the moving image of the area that is set as a comparison target on one of the moving image areas of the comparative-reproduction window. Furthermore, the identifying unit 133 acquires the moving image of the process, which is the pointed abnormal area, and sets the acquired moving image on the other one of the moving image areas of the comparative-reproduction window (Step S17). The identifying unit 133 outputs the comparative-reproduction window where the moving images have been completely set on the moving image areas to the image display unit 134 and proceeds to Step S14. This allows the management device 100 to reproduce the moving image that corresponds to the designated process and product.

As described above, on the basis of the information on the start times and the end times of manufacturing processes, the management device 100 displays the graph that indicates the time elapsed from the start to the end of each of the manufacturing processes, each of the manufacturing processes being segmented in order of execution of the manufacturing processes and the time axes being aligned in the identical direction. Furthermore, the management device 100 receives designation of the area that indicates manufacturing for any product in any manufacturing process on the displayed graph. Moreover, the management device 100 reproduces the captured image that corresponds to the start time to the end time of manufacturing for a specific product in a specific manufacturing process, specified by the area of which designation has been received, among the captured images for the manufacturing processes stored in the image DB 123. Accordingly, it is possible to reproduce the moving image that corresponds to the designated process and product.

Furthermore, the management device 100 displays the area that is on the graph and that indicates that the time elapsed from the start to the end of manufacturing for each product in a manufacturing process is in a predetermined state by being discriminable from the area that indicates that the predetermined state does not exist. Furthermore, the management device 100 receives designation of the area that indicates that the predetermined state exists. As a result, a predetermined state on the timeline graph, i.e., an abnormal area, is easily discriminable, and the moving image that corresponds to the process and the product related to the abnormal area is reproducible.

Furthermore, the management device 100 receives designation of multiple areas among the areas that indicate the start to the end of manufacturing for each product in each manufacturing process within the graph. Furthermore, with regard to each of the areas of which designation has been received, the management device 100 displays the captured image that is captured at the corresponding time in the corresponding manufacturing process in such a manner so as to determine which area the captured image corresponds to. As a result, the moving image of an abnormal area is easily comparable with the normal moving image.

Furthermore, the management device 100 starts to reproduce the captured image that corresponds to each of the areas by synchronizing the start time of manufacturing that is specified by each of the areas. As a result, the moving image of an abnormal area is easily comparable with the normal moving image.

Furthermore, on the first area of the screen, the management device 100 displays the graph that includes the time axes that are arranged parallel to each other by being related to the respective processes; and the line segment that connects the positions that are adjacent to each other in order of manufacturing among the positions on the time axes that correspond to either the start time or the end time of the respective manufacturing processes for the identical product. Furthermore, the management device 100 receives designation of the first line segment among the line segments displayed on the first area. Moreover, on the second area of the screen, the management device 100 displays the image captured in the time interval determined by the first line segment in the process that corresponds to the first line segment of which designation has been received. As a result, it is possible to reproduce the moving image that corresponds to the designated process and product.

Furthermore, among the line segments on the graph, the management device 100 displays the line segment that indicates that the time elapsed from the start to the end of manufacturing for each product in a process is in a predetermined state by being discriminable from the line segment that indicates that the predetermined state does not exist. Furthermore, the management device 100 receives designation of the first line segment among the line segments that indicate that the predetermined state exists. As a result, a predetermined state on the timeline graph, i.e., an abnormal area, is easily discriminable, and the moving image that corresponds to the process and the product related to the abnormal area is reproducible.

Furthermore, the management device 100 further receives designation of the second line segment among the line segments displayed on the first area. Furthermore, with regard to each of the first line segment and the second line segment, the management device 100 displays the image that is captured at the corresponding time in the corresponding process in such a manner so as to determine which line segment the image corresponds to. As a result, the moving image of an abnormal area is easily comparable with the normal moving image.

Furthermore, in the management device 100, the image is a moving image. Furthermore, the management device 100 starts to reproduce the first image that corresponds to the first line segment and the second image that corresponds to the second line segment by synchronizing the start time of manufacturing specified by the first line segment and the start time of manufacturing specified by the second line segment. As a result, the moving image of an abnormal area is easily comparable with the normal moving image.

Furthermore, in the above-described embodiment, the area that is related to the pointed process is displayed due to mask processing if the captured images that capture the processes are displayed; however, this is not a limitation. For example, the administrator of the manufacturing-state display system 1 may determine which process image is a desired image with regard to the captured images that capture the processes without performing mask processing. Thus, the state of the previous or next product is displayable so that situations may be easily understood.

Furthermore, components of each unit illustrated do not always need to be physically configured as illustrated in the drawings. Specifically, specific forms of separation and combination of units are not limited to those depicted in the drawings, and a configuration may be such that all or some of them are functionally or physically separated or combined in any unit depending on various types of loads, usage, or the like. For example, the graph display unit 131 and the image display unit 134 may be combined. Moreover, the illustrated processes are not limited to the above-described order, and they may be performed simultaneously or performed by changing the order to a degree that there is no contradiction in processing details.

All or any of various processing functions performed by each device may be implemented by a CPU (or a microcomputer such as an MPU or MCU (Micro Controller Unit). Furthermore, it is self-evident that all or any of the various processing functions may be implemented by programs analyzed and executed by a CPU (or a microcomputer such as an MPU or MCU) or by wired logic hardware.

Figure 16:
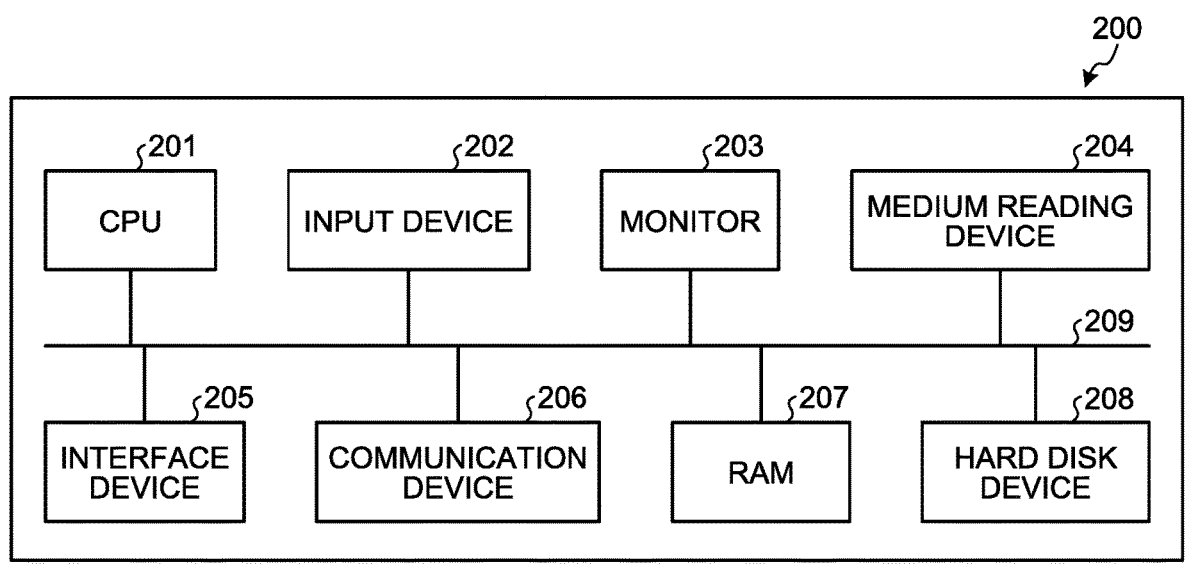
FIG. 16 is a diagram that illustrates an example of a computer that executes a manufacturing-state display program.

Furthermore, various processes described in the above-described embodiment may be implemented when a computer executes prepared programs. Therefore, an explanation is given below of an example of the computer that executes the program that has the same functionality as that in the above-described embodiment. FIG. 16 is a diagram that illustrates an example of the computer that executes the manufacturing-state display program.

As illustrated in FIG. 16, a computer 200 includes a CPU 201 that performs various calculation operations; an input device 202 that receives data input; and a monitor 203. Furthermore, the computer 200 includes a medium reading device 204 that reads programs, or the like, from a storage medium; an interface device 205 for connecting to various devices; and a communication device 206 for connecting to other information processing devices, or the like, wired or wirelessly. Furthermore, the computer 200 includes a RAM 207 that temporarily stores various types of information; and a hard disk device 208. Furthermore, the CPU 201, the input device 202, the monitor 203, the medium reading device 204, the interface device 205, the communication device 206, the RAM 207, and the hard disk device 208 are connected to a bus 209.

The hard disk device 208 stores the manufacturing-state display program that has the same functionality as each processing unit illustrated in FIG. 1; the graph display unit 131, the receiving unit 132, the identifying unit 133, and the image display unit 134. Furthermore, the hard disk device 208 stores the log DB 121, the camera definition table 122, the image DB 123, and various types of data for implementing the manufacturing-state display program. For example, the input device 202 receives various types of information, such as operation information or management information, input from the administrator of the computer 200. For example, the monitor 203 displays various screens such as the display screen or the screen for management information to the administrator of the computer 200. The interface device 205 is connected to for example a printing device. For example, the communication device 206 has the same functionality as the communication unit 110 illustrated in FIG. 1, and it is connected to an undepicted network to communicate various types of information with various devices.

The CPU 201 reads each program stored in the hard disk device 208, loads it into the RAM 207, and executes it, thereby performing various operations. Furthermore, the programs may cause the computer 200 to function as the graph display unit 131, the receiving unit 132, the identifying unit 133, and the image display unit 134 illustrated in FIG. 1.

Furthermore, the above-described manufacturing-state display program does not necessarily need to be stored in the hard disk device 208. For example, the computer 200 may read and execute the program stored in the storage medium readable by the computer 200. The storage medium readable by the computer 200 is equivalent to, for example, a portable recording medium such as CD-ROM, DVD disk, or USB (universal serial bus) memory, a semiconductor memory such as flash memory, or a hard disk drive. Furthermore, the manufacturing-state display program may be stored in the device connected to a public network, the Internet, LAN, or the like, and the computer 200 may read and execute the manufacturing-state display program from it.

It is possible to reproduce the moving image that corresponds to the designated process and product.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A manufacturing-state display system that displays a manufacturing status of a product manufactured through a plurality of manufacturing processes, the manufacturing-state display system comprising:
   a memory; and
   a processor coupled to the memory, wherein the processor executes a process comprising:
   displaying on a first region of a screen a graph that indicates a time elapsed from start to end of each of the manufacturing processes for each of products, based on information on a start time and an end time of each of the manufacturing processes for each of the products, wherein each of the manufacturing processes is segmented on the first region in order of execution of the manufacturing processes and time axes of the graph, that respectively correspond to the manufacturing processes are aligned in an identical direction;
   receiving designation of an area on the graph, the area corresponding to a manufacturing process for a product; and
   reproducing on second region of the screen a moving image that has captured the manufacturing process from a start time to an end time for the product specified by the designated area, the moving image being read from among moving images that are stored in a storage unit and have captured the manufacturing processes for each of the products.

2. The manufacturing-state display system according to claim 1, wherein
   the displaying the graph includes displaying a first area that is on the graph and that indicates that a time elapsed from start to end of a manufacturing process for a product corresponding to the first area is in a predetermined state by making the first area discriminable from a second area that indicates that a time elapsed from start to end of a manufacturing process for a product corresponding to the second area is not in the predetermined state, and
   the receiving includes receiving designation of the first area.

3. The manufacturing-state display system according to claim 1, wherein
   the receiving includes receiving designation of a first area and a second area that respectively indicate a first manufacturing process for a first product and a second manufacturing process for a second product on the graph, and
   the reproducing includes displaying a first moving image and a second moving image that have respectively captured the first manufacturing process for the first product and the second manufacturing process for the second product so that it is discriminable that the first moving image corresponds to the first area and the second moving image corresponds to the second area.

4. The manufacturing-state display system according to claim 3, wherein the reproducing includes starting to reproduce the first moving image and the second moving image by synchronizing start times of the first manufacturing process and the second manufacturing process.

5. A manufacturing-state display system that visualizes a manufacturing status of a product that is manufactured by conducting manufacturing through a plurality of processes in order, the manufacturing-state display system comprising:
   a memory; and
   a processor coupled to the memory, wherein the processor executes a process comprising:
   displaying, on a first area of a screen, a graph including line segments wherein the first area includes time axes that are arranged parallel to each other in relation to the respective processes and each of the line segments connects positions on the time axes, the positions being adjacent to each other in order of the manufacturing, and each corresponding to either a start time or an end time of the respective processes for an identical product;
   receiving designation of a first line segment among the line segments displayed on the graph, the first line segment corresponding to a first process; and
   displaying, on a second area of the screen, a first moving image captured in a time interval specified by the first line segment, of which designation has been received.

6. The manufacturing-state display system according to claim 5, wherein
   the displaying the graph includes displaying a line segment that is included in the line segments on the graph and that indicates that a time elapsed from start to end of a process for a product is in a predetermined state by making the line segment discriminable from another line segment that indicates that a time elapsed from start to end of a process for a product corresponding to the another line segment is not in the predetermined state, and
   the receiving includes receiving designation of the displayed line segment as the first line segment.

7. The manufacturing-state display system according to claim 5, wherein
   the receiving includes further receiving designation of a second line segment among the line segments displayed on the first area, the second line segment corresponding to a second process, and
   the displaying image includes displaying the first moving image and a second moving image that have respectively captured the first process and the second process so that it is discriminable that the first moving image corresponds to the first line segment and the second moving image corresponds to the second line segment.

8. The manufacturing-state display system according to claim 7, wherein
   the displaying the image includes starting to reproduce the first image and the second image by synchronizing a start time of the first process and a start time of the second process.

9. A manufacturing-state display method for displaying a manufacturing status of a product manufactured through a plurality of manufacturing processes, the manufacturing-state display method caused comprising:
   displaying on a first region of the screen a graph that indicates a time elapsed from start to end of each of the manufacturing processes for each of products, based on information on a start time and an end time of each of the manufacturing processes for each of the products, wherein each of the manufacturing processes is segmented on the first region in order of execution of the manufacturing processes and time axes of the graph, that respectively correspond to the manufacturing processes are aligned in an identical direction, using a processor;

receiving designation of an area on the graph, the area corresponding to a manufacturing process for a product, using the processor; and reproducing on a second region of the screen a moving image that has captured the manufacturing process from a start time to an end time for the product specified by the designated area, the moving image being read from among moving images that are stored in a storage unit and have captured the manufacturing processes for each of the products, using the processor.

10. The manufacturing-state display method according to claim 9, wherein the displaying the graph includes displaying a first area that is on the graph and that indicates that a time elapsed from start to end of a manufacturing process for a product corresponding to the first area is in a predetermined state by making the first area discriminable from a second area that indicates that a time elapsed from start to end of a manufacturing process for a product corresponding to the second area is not in the predetermined state, and the receiving includes receiving designation of the first area.

11. The manufacturing-state display method according to claim 9, wherein the receiving includes receiving designation of a first area and a second area that respectively indicate a first manufacturing process for a first product and a second manufacturing process for a second product on the graph, and the reproducing includes displaying a first moving image and a second moving image that have respectively captured the first manufacturing process for the first product and the second manufacturing process for the second product so that it is discriminable that the first moving image corresponds to the first area and the second moving image corresponds to the second area.

12. The manufacturing-state display method according to claim 11, wherein the reproducing includes starting to reproduce the first moving image and the second moving image by synchronizing start times of the first manufacturing process and the second manufacturing process.

13. A manufacturing-state display method for visualizing a manufacturing status of a product that is manufactured by conducting manufacturing through a plurality of processes in order, the manufacturing-state display method comprising:

displaying, on a first area of a screen, a graph including line segments wherein the first area includes time axes that are arranged parallel to each other in relation to the respective processes and each of the line segments connects positions on the time axes, the positions being adjacent to each other in order of the manufacturing, and each corresponding to either a start time or an end time of the respective processes for an identical product, using a processor;

receiving designation of a first line segment among the line segments displayed on the graph, the first line segment corresponding to a first process, using the processor; and displaying, on a second area of the screen, a first moving image captured in a time interval specified by the first line segment, of which designation has been received, using the processor.

14. The manufacturing-state display method according to claim 13, wherein the displaying the graph includes displaying a line segment that is included in the line segments on the graph and that indicates that a time elapsed from start to end of a process for a product is in a predetermined state by making the line segment discriminable from another line segment that indicates that a time elapsed from start to end of a process for a product corresponding to the another line segment is not in the predetermined state, and the receiving includes receiving designation of the displayed line segment as the first line segment.

15. The manufacturing-state display method according to claim 13, wherein the receiving includes further receiving designation of a second line segment among the line segments displayed on the first area, the second line segment corresponding to a second process, and the displaying image includes displaying the first moving image and a second moving image that have respectively captured the first process and the second process so that it is discriminable that the first moving image corresponds to the first line segment and the second moving image corresponds to the second line segment.

16. The manufacturing-state display method according to claim 15, wherein the displaying the image includes starting to reproduce the first image and the second image by synchronizing a start time of the first process and a start time of the second process.

17. A non-transitory computer-readable recording medium having stored therein a program that causes a computer to execute a process to display a manufacturing status of a product manufactured through a plurality of manufacturing processes, the process comprising:

displaying on a first region of the screen a graph that indicates a time elapsed from start to end of each of the manufacturing processes for each of products, based on information on a start time and an end time of each of the manufacturing processes for each of the products, wherein each of the manufacturing processes is segmented on the first region in order of execution of the manufacturing processes and time axes of the graph, that respectively correspond to the manufacturing processes are aligned in an identical direction;

receiving designation of an area on the graph, the area corresponding to a manufacturing process for a product; and reproducing on a second region of the screen a moving image that has captured the manufacturing process from a start time to an end time for the product specified by the designated area, the moving image being read from among moving images that are stored in a storage unit and have captured the manufacturing processes for each of the products.

18. The non-transitory computer-readable recording medium according to claim 17, wherein the displaying the graph includes displaying a first area that is on the graph and that indicates that a time elapsed from start to end of a manufacturing process for a product corresponding to the first area is in a predetermined state by making the first area discriminable from a second area that indicates that a time elapsed from start to end of a manufacturing process for a product corresponding to the second area is not in the predetermined state, and the receiving includes receiving designation of the first area.

19. The non-transitory computer-readable recording medium according to claim 17, wherein
the receiving includes receiving designation of a first area and a second area that respectively indicate a first manufacturing process for a first product and a second manufacturing process for a second product on the graph, and
the reproducing includes displaying a first moving image and a second moving image that have respectively captured the first manufacturing process for the first product and the second manufacturing process for the second product so that it is discriminable that the first moving image corresponds to the first area and the second moving image corresponds to the second area.

20. The non-transitory computer-readable recording medium according to claim 19, wherein the reproducing includes starting to reproduce the first moving image and the second moving image by synchronizing start times of the first manufacturing process and the second manufacturing process.

21. A non-transitory computer-readable recording medium having stored therein a program that causes a computer to execute a process to visualize a manufacturing status of a product that is manufactured by conducting manufacturing through a plurality of processes in order, the process comprising:
displaying, on a first area of a screen, a graph including line segments where in the first area includes time axes that are arranged parallel to each other in relation to the respective processes and each of the line segments connects positions on the time axes, the positions being adjacent to each other in order of the manufacturing, and each corresponding to either a start time or an end time of the respective processes for an identical product;
receiving designation of a first line segment among the line segments displayed on the graph, the first line segment corresponding to a first process; and
displaying, on a second area of the screen, a first moving image captured in a time interval specified by the first line segment, of which designation has been received.

22. The non-transitory computer-readable recording medium according to claim 21, wherein
the displaying the graph includes displaying a line segment that is included in the line segments on the graph and that indicates that a time elapsed from start to end of a process for a product is in a predetermined state by making the line segment discriminable from another line segment that indicates that a time elapsed from start to end of a process for a product corresponding to the another line segment is not in the predetermined state, and
the receiving includes receiving designation of the displayed line segment as the first line segment.

23. The non-transitory computer-readable recording medium according to claim 21, wherein
the receiving includes further receiving designation of a second line segment among the line segments displayed on the first area, the second line segment corresponding to a second process, and
the displaying image includes displaying the first moving image and a second moving image that have respectively captured the first process and the second process so that it is discriminable that the first moving image corresponds to the first line segment and the second moving image corresponds to the second line segment.

24. The non-transitory computer-readable recording medium according to claim 23, wherein
the displaying the image includes starting to reproduce the first image and the second image by synchronizing a start time of the first process and a start time of the second process.

* * * * *